(12) United States Patent
Jung et al.

(10) Patent No.: US 9,055,491 B2
(45) Date of Patent: Jun. 9, 2015

(54) HANDOVER DEVICE OF WIRELESS COMMUNICATION SYSTEM USING MULTI-COMPONENT CARRIER AND METHOD THEREOF

(75) Inventors: Myungcheul Jung, Seoul (KR); Kibum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 308 days.

(21) Appl. No.: 13/639,051

(22) PCT Filed: Apr. 5, 2011

(86) PCT No.: PCT/KR2011/002376
§ 371 (c)(1),
(2), (4) Date: Oct. 2, 2012

(87) PCT Pub. No.: WO2011/126276
PCT Pub. Date: Oct. 13, 2011

(65) Prior Publication Data
US 2013/0028236 A1    Jan. 31, 2013

(30) Foreign Application Priority Data
Apr. 5, 2010   (KR) .................. 10-2010-0031044

(51) Int. Cl.
*H04W 36/00*  (2009.01)
*H04W 36/28*  (2009.01)
*H04W 72/04*  (2009.01)

(52) U.S. Cl.
CPC .......... *H04W 36/0072* (2013.01); *H04W 36/28* (2013.01); *H04W 72/0426* (2013.01)

(58) Field of Classification Search
None
See application file for complete search history.

(56) References Cited

U.S. PATENT DOCUMENTS

| 2006/0013165 | A1* | 1/2006 | Choi et al. | 370/331 |
| 2008/0273503 | A1* | 11/2008 | Lee et al. | 370/336 |
| 2010/0061289 | A1* | 3/2010 | Mun et al. | 370/312 |
| 2010/0322185 | A1* | 12/2010 | Park et al. | 370/331 |

(Continued)

FOREIGN PATENT DOCUMENTS

| KR | 10-2009-0076504 | 7/2009 |
| KR | 10-2010-0016488 | 2/2010 |

(Continued)

OTHER PUBLICATIONS

International Search Report dated Nov. 25, 2011 issued for PCT/KR2011/002376.

*Primary Examiner* — Ayaz Sheikh
*Assistant Examiner* — Faiyazkhan Ghafoerkhan
(74) *Attorney, Agent, or Firm* — H.C. Park & Associates, PLC

(57) ABSTRACT

A source base station (SeNB) composes a handover request message including information of which at least one or more CC formed for a user terminal (UE) and information about the performance of the UE associated with at least one or more CC and transmits the handover message to a target base station (TeNB) and the TeNB transmits to the SeNB a handover request response message including at least one CC allocation information as information for the CC which the UE uses thereby or CC allocation information and a CC activation indicator associated with the CC allocation information, and an activation composition indicator having a bit length with respect to the allocated CCs. Packet loss due to the handover is minimized by enabling the UE to rapidly use the CC(s) to be used in the TeNB as the moved cell and transmission efficiency of a system can be enhanced thereby.

10 Claims, 20 Drawing Sheets

(56) References Cited

U.S. PATENT DOCUMENTS

| | | | |
|---|---|---|---|
| 2010/0322197 A1* | 12/2010 | Adjakple et al. | 370/332 |
| 2010/0330994 A1* | 12/2010 | Matsuo et al. | 455/436 |
| 2011/0026486 A1* | 2/2011 | Hapsari et al. | 370/331 |
| 2011/0183674 A1* | 7/2011 | Lee et al. | 455/436 |
| 2011/0200014 A1* | 8/2011 | Lee et al. | 370/332 |
| 2012/0002635 A1* | 1/2012 | Chung et al. | 370/329 |
| 2012/0002643 A1* | 1/2012 | Chung et al. | 370/331 |
| 2012/0008776 A1* | 1/2012 | Ishida et al. | 380/247 |
| 2012/0202501 A1* | 8/2012 | Morioka et al. | 455/436 |
| 2012/0236830 A1* | 9/2012 | Takano et al. | 370/331 |
| 2013/0100931 A1* | 4/2013 | Kim | 370/331 |

FOREIGN PATENT DOCUMENTS

| | | |
|---|---|---|
| KR | 10-2010-0025856 | 3/2010 |
| KR | 10-2010-0029027 | 3/2010 |

* cited by examiner

HANDOVER DEVICE OF WIRELESS COMMUNICATION SYSTEM USING MULTI-COMPONENT CARRIER AND METHOD THEREOF

CROSS-REFERENCE TO RELATED APPLICATIONS

This application is the National Stage Entry of International Application No. PCT/KR2011/002376, filed on Apr. 5, 2011 and claims priority from and the benefit of Korean Patent Application No. 10-2010-0031044, filed on Apr. 5, 2010, all of which are hereby incorporated by reference for all purposes as if fully set forth herein.

BACKGROUND

1. Field

The present invention relates to a method and apparatus for performing a handover in a wireless communication system that uses a multi-component carrier (CC), and more particularly, to a method and apparatus for transceiving information associated with CCs to be used by a user equipment (UE) during the handover.

2. Discussion of the Background

As communication systems have developed, various wireless terminals have been utilized by consumers, such as companies and individuals.

A current wireless communication system is a high capacity communication system capable of transceiving various data such as image data, wireless data, and the like, beyond providing a sound-based service. Accordingly, there is a desire for a technology that transmits high capacity data, which is comparable with a wired communication network. In addition, an error detection scheme that minimizes loss of information and increases system transmission efficiency so as to improve system performance may become essential.

In general, when a user equipment (UE) moves from a serving eNB or a source eNB (SeNB), that is, an evolved NodeB (eNB) to which the UE is currently connected, to a target eNB corresponding to a new eNB, a handover may be performed in a communication system. The handover may be a process that cancels connection with the SeNB, and establishes connection with the TeNB so as to enable continuous communication. To perform the handover, information required for establishing the connection between the UE and the TeNB may need to be obtained.

Unlike a conventional communication system using a single carrier that is formed of a single frequency band, a wireless communication system that uses a plurality of component carriers (CCs) has recently been discussed.

In the communication system using the plurality of CCs, each CC may function as a single cell. In the recently discussed wireless communication system, a handover signaling associated with each CC and detailed schemes to implement the handover signaling have not yet been determined. Therefore, there is a desire for a detailed handover scenario associated with a next generation communication system, by taking a plurality of CCs into consideration.

SUMMARY

Therefore, the present invention has been made in view of the above-mentioned problems, and an aspect of the present invention is to provide a handover method and apparatus that performs signaling of information associated with component carriers (CCs) to be used by a user equipment (UE) in a wireless communication system.

Another aspect of the present invention is to provide a method in which a source evolved NodeB (SeNB) performs signaling of information associated with CCs to be used by a UE in a wireless communication system, and an apparatus thereof.

Another aspect of the present invention is to provide a method in which a target eNB (TeNB) receives information associated with CCs to be used by the UE in a wireless communication system, and an apparatus thereof.

Another aspect of the present invention is to provide a method in which a TeNB determines information associated with CCs to be used by a UE and an activation indicator in a wireless communication system, and an apparatus thereof.

Another aspect of the present invention is to provide a method in which a UE receives information associated with CCs and an activation indicator through a handover message in a wireless communication system, and apparatus thereof.

Another aspect of the present invention is to provide a method and apparatus for defining messages to be used for a handover between a UE and an SeNB/TeNB, and for transceiving the defined messages.

In accordance with an aspect of the present invention, there is provided a handover signaling method used when a user equipment (UE) moves from a source evolved NodeB (SeNB) to a target eNB (TeNB) in a communication system that uses a multi-component carrier (CC), the method including: transmitting, to the TeNB, a handover request message including radio resource configuration information of a serving cell (SCell) configured for a corresponding UE in the SeNB or a source cell; receiving, from the TeNB, a handover request acknowledgement (ACK) message including information associated with CCs to be used by the UE after a handover; and generating a handover command message including the received information associated with the CCs to be used by the UE, and transmitting the handover command message to the UE.

In accordance with another aspect of the present invention, there is provided a handover signaling method used when a UE moves from an SeNB to a TeNB in a communication system that uses a multi-CC, the method including: receiving, from the SeNB, a handover request message including radio resource configuration information of an SCell configured for a corresponding UE in the SeNB or a source cell; determining a handover based on the information received from the SeNB and a state of available resources; and generating a handover request ACK message including information associated with CCs to be used by the UE after a handover and transmitting the handover request ACK message to the SeNB.

In accordance with another aspect of the present invention, there is provided a handover signaling method used when a UE moves from an SeNB to a TeNB in a communication system that uses a multi-CC, the method including: receiving, from the SeNB, a handover command message including information associated with CCs to be used by the UE; and connecting with the TeNB through one or more predetermined CCs, based on information included in the handover command message.

In accordance with another aspect of the present invention, there is provided a handover signaling apparatus used when a UE moves from an SeNB to a TeNB in a communication system that uses a multi-CC, the apparatus including: a handover request message processing unit to transmit, to the TeNB, radio resource configuration information of an SCell configured for a corresponding UE in the SeNB or a source cell; a handover request ACK message processing unit to receive, from the TeNB, a handover request ACK message including information associated with CCs to be used by the UE; and a handover command message processing unit to generate a handover command message including the information associated with the CCs to be used by the UE, and to transmit the handover command message to the UE.

In accordance with another aspect of the present invention, there is provided a handover signaling apparatus used when a UE moves from an SeNB to a TeNB in a communication system that uses a multi-CC, the apparatus including: a handover request message receiving unit to receive, from the SeNB, radio resource configuration information of an SCell configured for a corresponding UE in the SeNB or a source cell; a handover admission controller to determine a handover based on the information received from the SeNB and a state of available resources; and a handover request ACK message processing unit to generate a handover request ACK message including information associated with CCs to be used by the UE, and to transmit the handover request ACK message to the SeNB.

In accordance with another aspect of the present invention, there is provided a handover signaling apparatus used when a UE moves from an SeNB to a TeNB in a communication system that uses a multi-CC, the apparatus including: a handover command message processing unit to receive, from the SeNB, a handover command message including information associated with CCs to be used by the UE; and a handover processing unit to perform controlling to connect with the TeNB through one or more predetermined CCs based on the information included in the handover command message.

In accordance with another aspect of the present invention, there is provided a method of performing a handover in a communication system that uses a multi-CC, the method including: performing, by a UE, measurement and transmitting a measurement result to a SeNB; generating, by the SeNB, a handover request message including at least one of information associated with at least one CC configured for the UE and information associated with a capability of the UE associated with the at least one CC, and transmitting the handover request message to a TeNB; generating, by the TeNB, a handover request ACK message including at least one of CC allocation information (CC Allocation Info) corresponding to information associated with CCs to be used by the UE, both the CC allocation information and a CC activation indicator (CC Activation Ind) associated with the CC allocation information, and an active configuration indicator having a predetermined bit length with respect to allocated CCs, in response to the handover request message, and transmitting the handover request ACK message to the SeNB; and receiving, by the UE from the SeNB, a handover command message generated based on the handover request ACK message, and completing the handover to the TeNB.

In accordance with another aspect of the present invention, there is provided a handover signaling apparatus used when a UE moves from an SeNB to a TeNB in a communication system that uses a multi-CC, the apparatus including: a handover request message processing unit to generate a handover request message including at least one of information associated with at least one CC configured for the UE and information associated with a capability of the UE associated with the at least one CC, and to transmit the handover request message to the TeNB; and a handover request ACK message processing unit to receive, from the TeNB, a handover request ACK message configured by the TeNB to include at least one of CC allocation information (CC Allocation Info) corresponding to information associated with CCs to be used by the UE, both the CC allocation information and a CC activation indicator (CC Activation Ind) associated with the CC allocation information, and an active configuration indicator having a predetermined bit length with respect to allocated CCs.

In accordance with another aspect of the present invention, there is provided a handover signaling apparatus used when a UE moves from an SeNB to a TeNB in a communication system that uses a multi-CC, the apparatus including: a handover request message receiving unit to receive, from the SeNB, a handover request message including at least one of information associated with at least one CC configured for the UE and information associated with a capability of the UE associated with the at least one CC; and a handover request ACK message processing unit to generate, in response to the handover request message, a handover request ACK message including at least one of CC allocation information (CC Allocation Info) corresponding to information associated with CCs to be used by the UE, both the CC allocation information (CC Allocation Info) and a CC activation indicator (CC Activation Ind) associated with the CC allocation information, and an active configuration indicator having a predetermined bit length with respect to allocated CCs, and to transmit the handover request ACK message to the SeNB.

In accordance with another aspect of the present invention, there is provided a handover signaling apparatus used when a UE moves from an SeNB to a TeNB in a communication system that uses a multi-CC, the apparatus including: a handover command message processing unit to receive a handover command message that is generated and transmitted by the SeNB based on a handover request ACK message configured by the TeNB to include at least one of CC allocation information (CC Allocation Info) corresponding to information associated with CCs to be used by the UE, both the CC allocation information (CC Allocation Info) and a CC activation indicator (CC Activation Ind) associated with the CC allocation information, and an active configuration indicator having a predetermined bit length with respect to allocated CCs; and a handover processing unit to complete a handover to the TeNB based on the handover command message.

In accordance with aspects of the present invention, information associated with CCs to be used by a UE after a handover, which is included in a handover request ACK message or a handover command message, may be determined based on one of a first scheme that includes only CC allocation information (CC Allocation Info), a second scheme that includes both the CC allocation information and CC activation indicator (CC Activation Ind), and a third scheme that includes an active configuration indicator.

DETAILED DESCRIPTION OF THE ILLUSTRATED EMBODIMENTS

Figure 1:
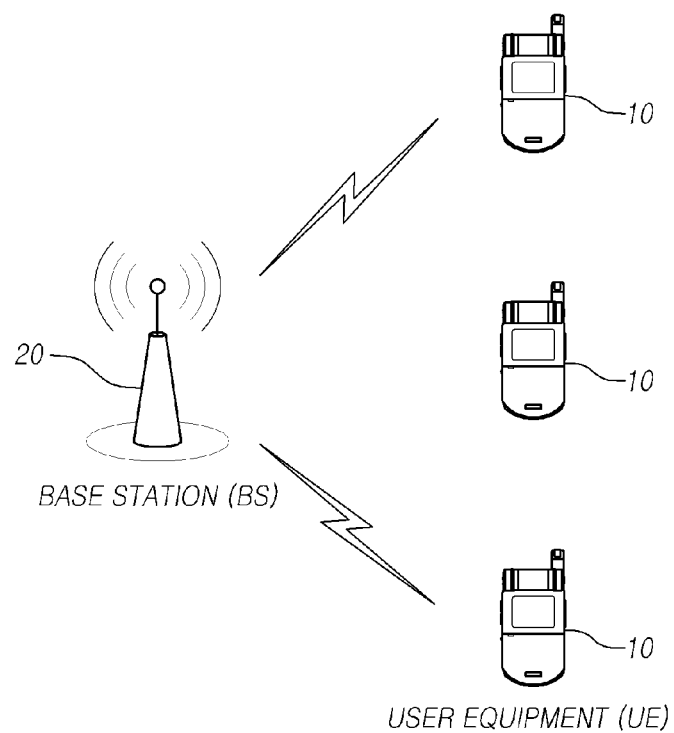
FIG. 1 is a diagram illustrating a wireless communication system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system according to an embodiment of the present invention.

The wireless communication system may provide various communication services such as voice data, packet data, and the like.

Referring to FIG. 1, the wireless communication system may include a user equipment (UE) 10 and an evolved Node-B (eNB). A handover signaling technique in a multi-component carrier (CC) environment may be used for a UE 10 and an eNB 20, which will be described in the following embodiments.

The UE 10 may be an inclusive concept indicating a user terminal utilized in a wireless communication, including a UE in WCDMA, Long Term Evolution (LTE), HSPA, and the like, and a mobile station (MS), a user terminal (UT), a subscriber station (SS), a wireless device and the like in GSM.

The eNB or a cell may refer to all devices, a function, or a predetermined area where communication with the UE is performed, and may also be referred to as a Node-B, a sector, a site, a base transceiver system (BTS), an access point, a relay node, and the like. That is, the eNB 20 or the cell may be construed as an inclusive concept indicating a function or a portion of an area covered by a base station controller (BSC) in CDMA, a NodeB in WCDMA, an eNB or a sector in LTE, and the like, and the concept may include various cell coverage areas, such as a megacell, a macrocell, a microcell, a picocell, a femtocell, a communication range of a relay node, and the like.

The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. Here, uplink (UL) transmission and downlink (DL) transmission may be performed based on a time division duplex (TDD) scheme that performs transmission based on different times, or based on a frequency division duplex (FDD) scheme that performs transmission based on different frequencies.

The wireless communication system may support a UL and/or DL HARQ, and may use a channel quality indicator (CQI) for link adaptation. Also, a multiple access scheme for DL transmission and a multiple access scheme for UL transmission may be different from each other. For example, a DL may use OFMDA and a UL may use single carrier-FDMA (SC-FDMA).

A conventional communication system may include a single carrier having a predetermined frequency bandwidth (up to 20 MHz). However, extension of a bandwidth has been discussed to satisfy service requirements for a next generation communication system. In this example, a unit carrier that the UE may have may be defined to be a CC, and an active discussion about a carrier aggregation (CA) scheme is in progress that binds up to N CCs to use as a single band.

According to the CA scheme, a frequency band allocated as CCs may be contiguous or non-contiguous. For example, a bandwidth may be extended up to 100 MHz by binding five (N=5) CCs. That is, a frequency band may be set to have a bandwidth of 20 MHz or more based on a configuration of the wireless communication system. Here, a CC may be classified, based on a characteristic, into three types, that is, a backwards compatible carrier (BC), a non-backwards compatible carrier (NBC), and an extension carrier (EC).

In the next generation wireless communication system, the UE may need to obtain control information associated with each CC so as to perform an appropriate operation with respect to a plurality of allocated CCs that are capable of receiving a signal. Conversely, in the conventional communication system that uses a single CC, the UE may receive only information associated with the single CC based on a handover situation, and may use the information for a handover.

In other words, when a CA communication system that uses a plurality of CCs performs a handover, the system may sequentially receive information associated with an added CC(s) and reconfigure the information associated with total CCs to be used by the UE. In this example, a delay and the like may occur due to a reconfiguration setting process associated with the plurality of CCs and the like, and deterioration of a service quality for the UE may occur due to the delay.

Therefore, the wireless communication system that uses a plurality of CCs may perform signaling to inform a TeNB and/or the UE of information associated with CCs to be used in an eNB (for example, the TeNB) to which the UE moves, before a handover and thus, may minimize the deterioration of the service quality caused by the handover.

Figure 2:
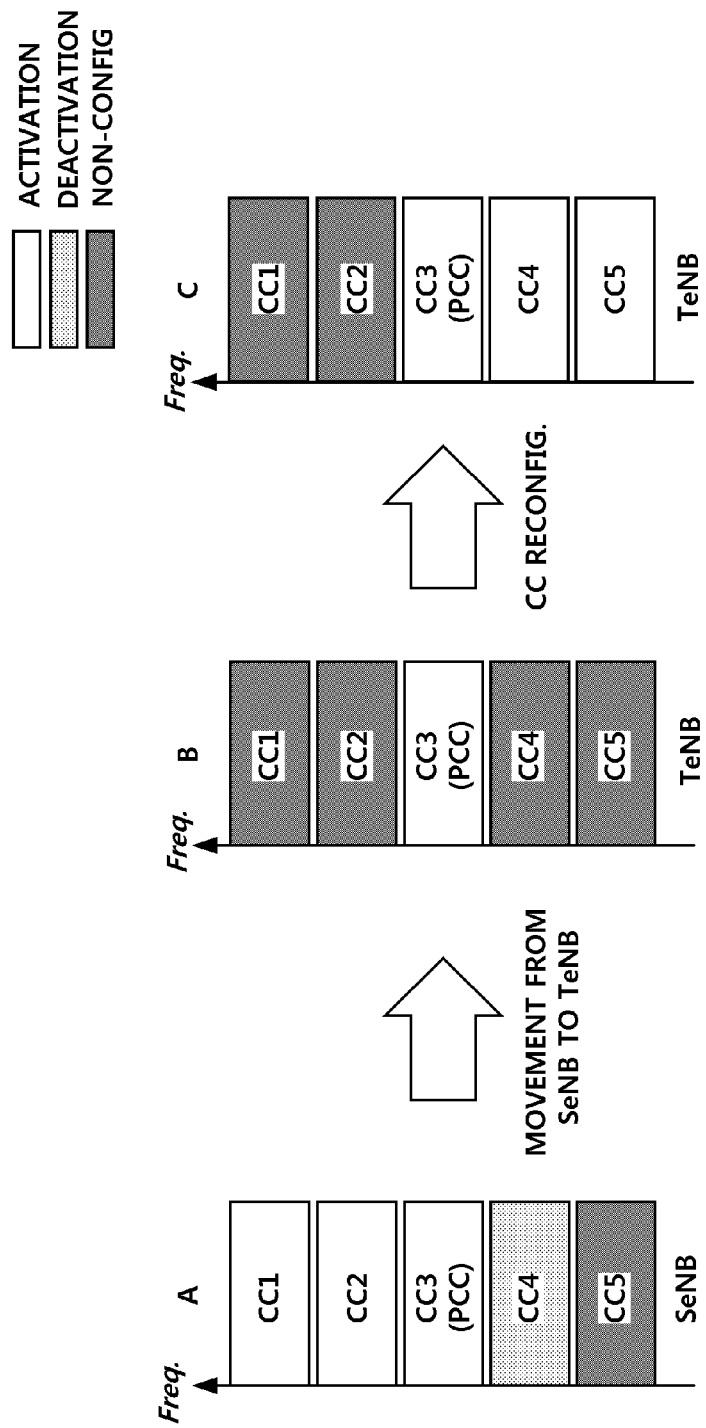
FIG. 2 is a diagram illustrating an example of a CC configuration in a wireless communication system according to an embodiment of the present invention.

FIG. 2 illustrates an example of a CC configuration in a wireless communication system according to an embodiment of the present invention, and particularly, may show a process of reconfiguring CCs to be used by a UE when the UE moves from a currently connected SeNB to a TeNB.

In the specifications, a CC that may be used by the UE may be in an activation state or a deactivation state, in a configuration complete state. Here, the configuration complete state may indicate a state in which the UE receives signaling information indicating that packet data may be transmitted through a corresponding CC, and may be capable of transceiving a packet. That is, the configuration complete state may correspond to a state in which connection, such as a physical layer, a protocol layer, and the like, is set up between the UE and the eNB.

The activation state may be a state in which the eNB has a packet to transmit to the UE, and is capable of transmitting a packet. In this example, the UE may be in a state of monitoring or receiving a physical downlink control channel (PDCCH) and the like of a corresponding CC so as to determine resources (a frequency resource, a time resource, and the like) allocated to the UE. The deactivation state may be a state in which the eNB does not have a packet to transmit to the UE, but completes preparation for transmitting a packet. Here, completion of preparation for transmission may correspond to a state in which a setting on a physical layer or a protocol layer has been completed. The UE in the deactivation state may be in a state of not monitoring or not receiving a control channel (a PDCCH and the like) of a corresponding CC to be used for determining resources (a frequency resource, a time resource, and the like) allocated to the UE.

The reason to distinguish a state of the CC as the activation state and the deactivation state, is to minimize battery consumption by limiting, to the activation state, an operation by the UE for monitoring or receiving the control channel (PDCCH).

In a handover signaling process, when the UE moves from an SeNB to a TeNB for a handover, the UE may establish a connection or an RRC connection through a predetermined CC.

In this example, a single CC that establishes a connection or an RRC connection with the UE from among a plurality of CCs at an initial state may be referred to as a primary CC (PCC) or a primary service cell (PCell). The PCC may be used as a predetermined CC that takes charge of performing signaling with respect to a plurality of CCs to be used by the UE, that is, provided from the eNB, that is, managing a connection or an RRC connection, and that manages a UE context corresponding to connection information associated with the UE, but it may not be limited thereto. Also, when a connection with the UE is established and a connection mode becomes an RRC connection mode, the PCC may be in an activation state.

Remaining CCs allocated to the UE excluding the PCC may be referred to as a secondary cell (SCC) or a second serving cell (SCell). The SCC may be an extension carrier that is extended for additional resource allocation for the UE, in addition to the PCC, and a state of the SCC may be classified into an activation state and a deactivation state.

In the specifications, the PCC or the PCell may be used as a concept equivalent to a PCell, and the SCC or the SCell may be used as a concept equivalent to an SCell. Here, a DL CC corresponding to the PCell may be referred to as a DL PCC, and a UL CC corresponding to the SCell may be referred to as a UL PCC. Also, in a DL, a CC corresponding to the SCell may be referred to as a DL SCC. In a UL, a CC corresponding to the SCell may be referred to as a UL SCC.

The PCell and the SCell have characteristics as follows.

First, the PCell may be used for PUCCH transmission.

Second, the PCell is always activated, whereas the SCell is activated or deactivated based on a predetermined condition.

Third, when the PCell experiences radio link failure (RLF), RRC reconnection may be triggered. When the SCell experiences RLF, RRC reconnection may not be triggered.

Fourth, the PCell may be changed by a change of a security key or by a handover procedure accompanying a random access channel (RACH) procedure. In a case of an MSG4 (contention resolution), only a PDCCH that indicates the MSG4 may be transmitted through the PCell, and MSG4 information may be transmitted through the PCell or the SCell.

Fifth, non-access stratum (NAS) information may be received through the PCell.

Sixth, the PCell may be configured as a pair of a DL PCC and a UL PCC.

Seventh, each UE sets a different CC as the PCell.

Eighth, a procedure such as, reconfiguration, adding, and removal of the SCell may be performed by an RRC layer. To add a new SCell, RRC signaling may be used to transmit system information associated with a dedicated SCell.

Technical concept of the PCell and the SCell in embodiments of the present invention may not be limited to the descriptions provided in the foregoing, and may include further examples.

That is, the CC may be defined to be an inclusive concept indicating a DL CC or a UL CC in the specifications. In this example, a DL CC or a UL CC may be considered to be a unit to which a frequency of a predetermined size is allocated. Also, a cell that takes a CC into consideration may be defined to include a DL CC or both a DL CC and a UL CC.

In other words, the cell may be defined by only DL frequency resources (for example, a CC) through which a wireless signal recognized by a UE reaches a predetermined area, and may be defined to be a pair of the DL frequency resources that is used by the UE to receive a signal from the eNB and UL frequency resources that is used by the UE to transmit a signal to the eNB. Therefore, with respect to only a UE that is able to form a plurality of CCs, the eNB may be able to form a plurality of serving cells to perform transmission and reception of data with the UE In particular, the PCell may indicate a single serving cell that provides a security input and NAS mobility information in an RRC establishment state or re-establishment state. Also, based on the capabilities of the UE, at least one cell may be configured to form a serving cell set with the PCell, and the at least one cell may be referred to as an SCell.

In the state A of FIG. 2, the UE is in a state of receiving a service from an SeNB through CC1, CC2, and CC3. In this example, CC3 may be assumed to be a PCC. CC1 and CC2 may be SCCs. When the UE moves to a TeNB, CC3 of the TeNB may be measured and an operation for a handover may be performed.

The state B of FIG. 2 shows an initial state after the UE moves to the TeNB, and the UE may establish a connection or an RRC connection with the TeNB through the PCC CC3. In this example, the UE may not be aware of information associated with remaining CCs excluding information associated with CC3. Therefore, the UE may not receive a service through CC1, CC2, CC4, and CC5, in the handover initial state (the state B of FIG. 2) after connecting with CC3. That is, the TeNB may need to additionally allocate CC4, CC5, and the like so that the UE maintains a service quality as in the SeNB.

Therefore, the UE may establish a connection or an RRC connection with the TeNB, and may need to perform a process of reconfiguration of CC4 and CC5 that are additionally allocated by TeNB. That is, the UE may obtain information associated with CC4 and CC5 through the reconfiguration process.

The state C of FIG. 2 shows a state in which the UE completes the reconfiguration process after receiving the information associated with CC4, CC5, and the like. Subsequently, the UE may receive an activation indication associated with CC4 and CC5 from the TeNB, may change a state into an activation state, and may receive a packet from CC4 and CC5.

As described in the foregoing, the UE may not be aware of information associated with a plurality of CCs used in the TeNB, immediately after connecting with the PCC and thus, the UE may need to additionally perform the CC reconfiguration process with respect to CCs to be used, and may receive a signaling indicating an activation of an SCC. In the process, the SeNB may not receive an existing service.

Therefore, in the embodiments of the present invention, the TeNB may transmit, to the SeNB, information associated with CCs to be used by the UE to be handed over, and the SeNB that receives the information may transmit the information associated with the CCs to the UE to be handed over, so that the UE may quickly connect with the TeNB and a service quality may be prevented from being deteriorated when compared to that before the handover.

In the embodiments of the present invention, the UE may transmit, to the TeNB, a handover request message including at least one of CC use information of a CC that is currently used by the UE, and CC capacity information, the TeNB may transfer, to the SeNB, a handover request ACK message including information associated with CCs to be used by the UE after a handover, the SeNB may generate a handover command message including information associate with the CCs to be used by the UE after the handover and may transmit the handover command message to the UE, and the UE may receive the handover command message and may immediately connect with the TeNB through a CC activated based on the information included in the handover command message.

The handover request message may include information associated with SCells configured in the SeNB or a source cell or radio resource configuration information of an SCC. The radio resource configuration information may indicate a configuration state of radio resources, such as a common radio resource or a dedicate radio resource of an SCell configured in the SeNB or the source cell. Also, the information associated with the SCells may include SCell configuration list information (SourceSCellConfigList) and the like. The information associated with the SCells or radio resource configuration information of the SCC may be expressed as CC use information associated with the UE in the SeNB.

Also, information transferred to the UE, that is, the information associated with the CCs to be used by the UE after the handover may be configured based on one of a first scheme that includes only CC allocation information (CC Allocation Info), a second scheme that includes both the CC allocation information and a CC activation indicator (CC Activation Ind), and a third scheme that includes an active configuration indicator.

The CC use information (CC Use Info) may be information associated with a plurality of CCs that is currently used by the UE in the SeNB, and may include CC allocation information associated with CCs allocated to the UE, information associated with an amount of allocated resources, information associated with a number of used CCs, bandwidth information of each CC, center frequency information, scheduling information, and the like. The CC use information may be an inclusive concept including all information associated with the plurality of CCs that is currently used in the SeNB.

Also, the TeNB that receives the CC use information may transmit the CC use information including CC allocation information associated with CCs to be used by the UE after the handover. The CC allocation information may be information associated with a plurality of CCs to be used by the UE in the TeNB after the handover, and may include CC allocation information associated with CCs allocated to the UE, information associated with an amount of allocated resources, information associated with a number of used CCs, bandwidth information of each CC, center frequency information, scheduling information, an antenna port number, and the like. The CC use information may be an inclusive concept including all information associated with the plurality of CCs to be allocated by the TeNB to the UE.

Accordingly, the SeNB that receives the CC allocation information may transmit the CC allocation information to the UE. That is, the UE may receive the CC allocation information before establishing a connection or an RRC connection with the TeNB. Therefore, the UE may perform RRC connection with the TeNB through CC3 corresponding to the PCC, and may prepare for packet reception by determining CC4 and CC5 corresponding to SCCs included in the CC allocation information. Accordingly, a service may be supported without a separate RRC reconfiguration process associated with CC4 and CC5.

In the specifications, varied names and expressions for varied messages may be defined for ease of descriptions and thus, it may not be construed within a meaning of a term and may be construed as an inclusive definition including different expressions or terms indicating the same use.

Figure 3:
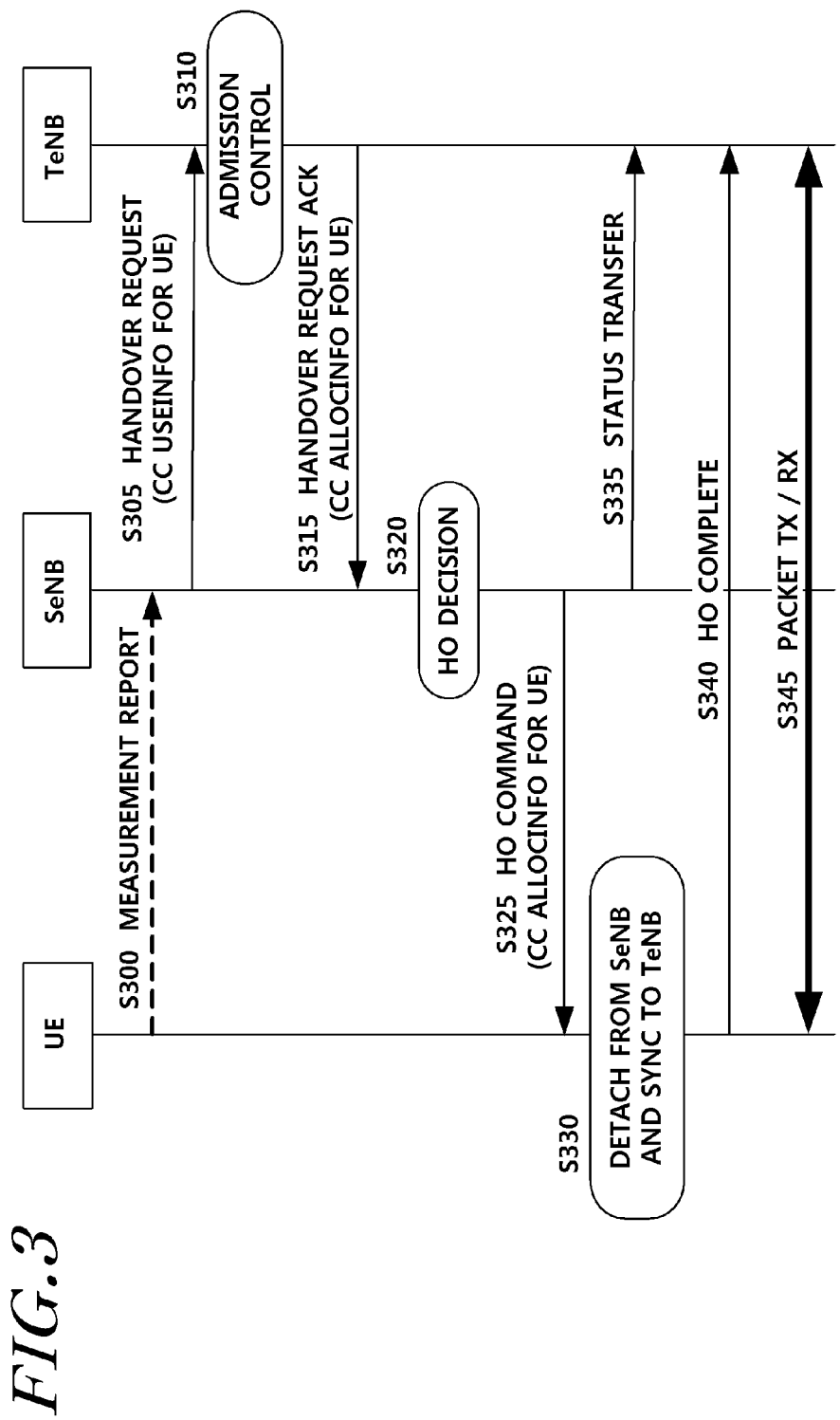
FIG. 3 is a diagram illustrating a handover process according to an embodiment of the present invention.

FIG. 3 illustrates a handover process according to an embodiment of the present invention.

Referring to FIG. 3, a UE may perform measurement indicated by an SeNB, and may transmit a measurement report to the SeNB (step S300). Although the measurement and the measurement report may be performed in response to a predetermined event, the specifications may not limit the predetermined event and may omit detailed descriptions of the predetermined event.

The SeNB may determine the measurement report transmitted from the UE, may determine whether to perform a handover of the UE, and may transmit a handover request message to a TeNB (step S305).

The handover request message may include CC use information. The CC use information may be information associated with a CC(s) set for the UE to simultaneously use a plurality of CCs in the SeNB, and may include CC allocation information associated with CCs allocated to the UE, information associated with an amount of allocated resources, information associated with a number of used CCs, bandwidth information of each CC, center frequency information, scheduling information, and the like.

The TeNB may perform handover admission control that may allow or disallow a handover of a corresponding UE, based on a state of currently available resources and the like (step S310). Subsequently, the TeNB may transmit a handover request ACK message to the SeNB (step S315). The handover request ACK message may include information associated with allowance or disallowance of the handover of the corresponding UE. Also, the handover request ACK message may include CC allocation information. The CC allocation information may be information associated with one or more CCs to be used by the UE in the TeNB after the handover, and may include CC allocation information associated with CCs allocated to the UE (information associated with a number or an ID of each allocated CC and the like), information associated with an amount of allocated resources, information associated with a number of used CCs, bandwidth information of each CC, center frequency information, scheduling information, an antenna port number, and the like.

The SeNB may determine whether a handover is allowable based on the handover request ACK message received from the TeNB (step S320; HO Decision). When the handover is allowable, the SeNB may transmit a handover command message to the UE (step S325). The handover command message may include CC allocation information. The CC allocation information may be information associated with each CC set for the UE to simultaneously use a plurality of CCs in the TeNB, and may include CC allocation information associated with CCs allocated to the UE, information associated with an amount of allocated resources, information associated with a number of used CCs, bandwidth information of each CC, center frequency information, scheduling information, an antenna port number, and the like.

Accordingly, the UE may determine the CC allocation information associated with the CCs allocated to the UE, through use of the handover command message, and may recognize information associated with CCs to be used in the TeNB after the handover and thus, the UE may connect with the TeNB without an additional signaling. Accordingly, the UE that receives the handover command message may terminate the connection with the currently connected SeNB, and may start a process for connecting with the TeNB which is a new cell (step S330). The SeNB may transmit information associated with a status of the UE to the TeNB (step S335). In this example, the information associated with the status of the UE may be context information used by the UE in the SeNE, but it may not be limited thereto.

The UE may transmit a handover complete message to the TeNB, and may complete establishing a connection with the TeNB and performing the handover to the TeNB (HO Complete; step S340). The completion of the handover may indicate an operation for layer 1 and 2 connection. The layer 1 and 2 connection operation may include an operation performed in an RACH and the like, but it may not be limited thereto.

Subsequently, the UE may complete establishing the connection with the TeNB, and may enter into a state in which the UE is capable of transceiving packet data and may transmit and receive a packet (step S345).

Figure 4:
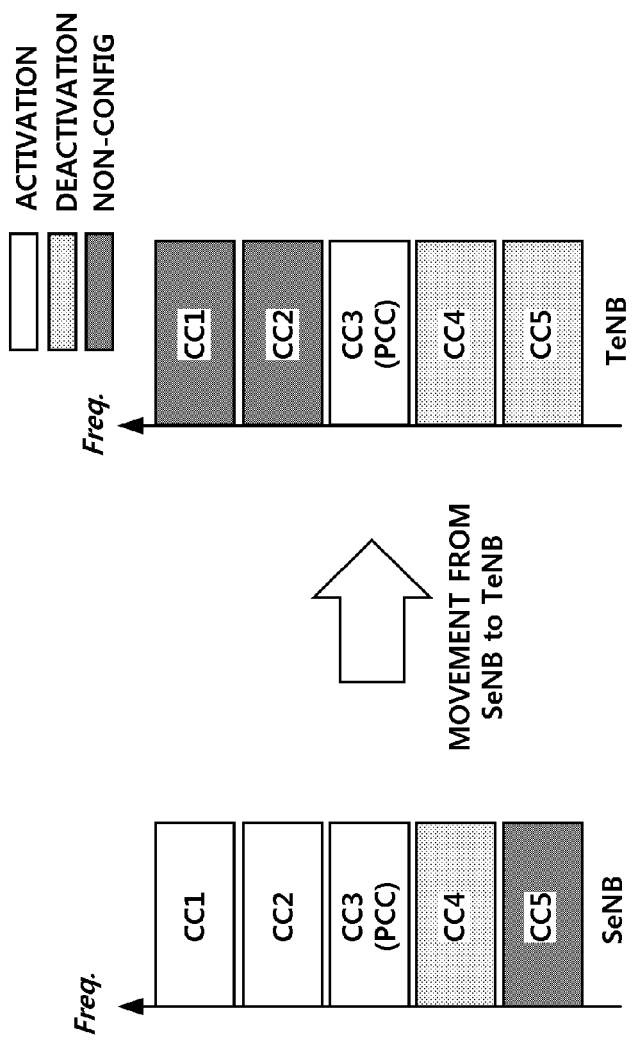
FIGS. 4 and 5 are diagrams illustrating examples of a CC setting when a handover signaling is performed according to an embodiment of the present invention.
Figure 5:
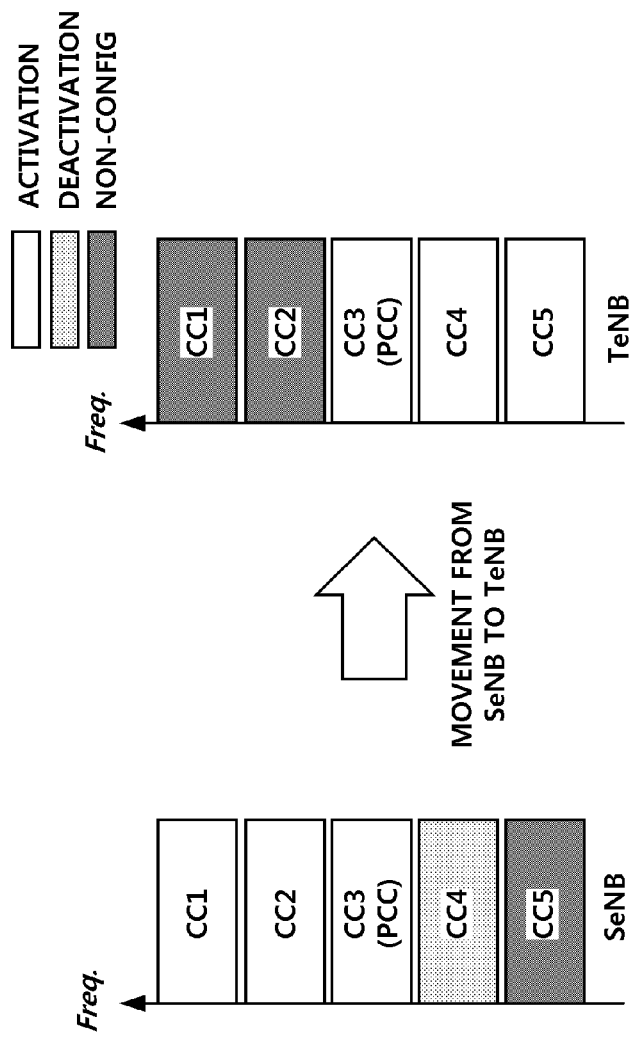

FIGS. 4 and 5 illustrate examples of a CC setting when a handover signaling is performed according to an embodiment of the present invention. In particular, FIG. 4 shows a situation in which a UE maintains CC3 corresponding to a PCC or a PCell to be in an activation state, and maintains CC4 and CC5 corresponding to an SCC or an SCell to be in a deactivation state when the UE moves from an SeNB to a TeNB.

Referring to FIG. 4, the UE may establish an RRC connection with the PCC. Accordingly, the UE may receive CC allocation information from the SeNB through a handover process. Here, the CC allocation information may be the same as CC allocation information transmitted from the TeNB to the SeNB, or may be information that is changed from the information in a form that the UE may be able to use.

Therefore, the UE may be aware that CCs to be used in the TeNB may be CC3, CC4, and CC5. The TeNB may set information associated with CCs to be used by the UE while preparing a handover after receiving a handover request from the SeNB, and may perform preparation so that the UE may use the CCs immediately after the handover to the TeNB. That is, it is a state in which an RRC configuration for the UE is completed. The configuration complete state may be a state in which the UE is capable of transceiving a packet only when signaling information indicating that packet data may be transmitted through a corresponding CC is received, and may be a state in which setting of a physical layer, a protocol layer, or the like is completed.

Also, when the UE selects CCs to be used in the TeNB, the CCs may be configured based on a CC that is allocable based on a capability of the UE. A system may select a CC that is allocable to the UE from among CCs corresponding to a band allocable to the UE, based on capability information of the UE, and may transmit associated information to the SeNB. The SeNB may transmit the CC allocation information to the UE.

FIG. 5 shows a situation in which the UE maintains CC3 corresponding to a PCC or a PCell to be in an activation state, and maintains CC4 and CC5 corresponding to an SCC or an SCell to be in an activation state when the UE moves from an SeNB to a TeNB.

Referring to FIG. 5, the UE may receive CC allocation information from the SeNB, and the CC allocation information may be the same as CC allocation transmitted from the TeNB to the SeNB or may be information that is changed from the information in a form that the UE may be able to use.

The UE may determine that CCs to be used in the TeNB may be CC3, CC4, and CC5. The TeNB may be in an activation state that is capable of transmitting a packet since the TeNB sets information associated with CCs to be used by the UE during a process of preparing a handover after receiving a handover request from the SeNB, and completes preparation so that the UE may use the CCs immediately after the handover to the TeNB. That is, the UE may determine that CC3, CC4, and CC5 corresponding to CCs to be used in the TeNB are in an activation state. The activation state may be a state in which the UE performs monitoring of a control channel (PDCCH) to enable the eNB to immediately perform packet transmission. This may include a case in which the TeNB manages a CC to be in an activation state with respect to the UE so that packet transmission is performed immediately after the handover and a packet interruption time may be minimized.

Although the UE may receive CC allocation information before the handover, a signaling that activates a predetermined CC so as to transmit and receive a packet through the corresponding CC, may be required as shown in FIGS. 4 and 5. The signaling used for the activation may include a signaling for CC configuration (or CC reconfiguration), or may perform a separate signaling.

Figure 6:
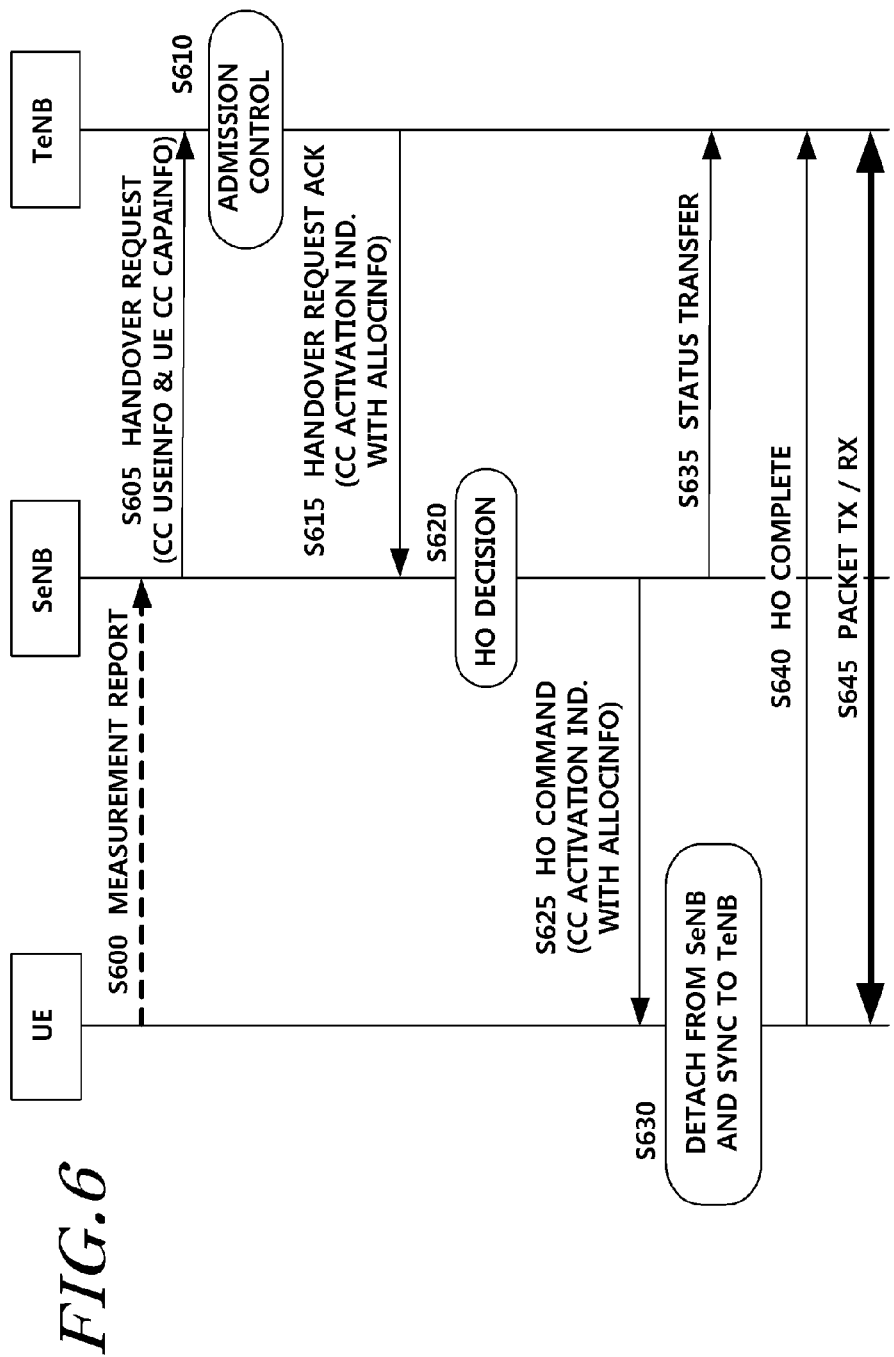
FIG. 6 is a diagram illustrating a handover signaling process according to another embodiment of the present invention.

FIG. 6 illustrates a handover signaling process according to an embodiment of the present invention.

FIG. 6 shows a process that performs signaling of CC configuration information associated with CCs to be used in a TeNB, and information associated with whether each CC is activated, with respect to a UE.

The UE may perform measurement indicated by an SeNB, and may transmit a measurement report to the SeNB (step S600).

The SeNB may determine whether a handover is required based on the measurement report received from the UE, and may transmit a handover request message to the TeNB (step S605). The handover request message may include CC capacity information. The CC capacity information may be information associated with the capability of the UE associated with a CC, and may include a maximum number of CCs that the UE is able to use, frequency band width information of each CC, center frequency information, and the like. Also, the CC capacity information may include all information associated with the capability of the UE associated with the CC. The CC capacity information may be transmitted to the SeNB over a core network (CN) or may be directly transmitted by the UE to the SeNB.

Also, the handover request message may include CC use information. The CC use information may be information associated with each CC set for the UE to simultaneously use a plurality of CCs in the SeNB, and may include CC allocation information associated with CCs allocated to the UE, information associated with an amount of allocated resources, information associated with a number of used CCs, bandwidth information of each CC, center frequency information, scheduling information, and the like.

The TeNB may perform handover admission control that may allow or disallow a handover of a corresponding UE, based on a state of currently available resources and the like (step S610). In this example, the TeNB may determine whether a CC included in the CC capacity information (UE CC CapaInfo) is able to be provided, and may configure all CCs that are available to the UE to be in a configuration complete state. From among all the CCs in the configuration complete state, a CC that is scheduled to immediately transmit a packet to the UE may be changed to be in an activation state.

Subsequently, the TeNB may transmit a handover request ACK message to the SeNB (step S615). The handover request ACK message may include information associated with allowance or disallowance of the handover of the corresponding UE. Also, the handover request ACK message may include a CC activation indicator (CC Activation Ind.). The CC activation indicator may be information associated with at least one CC that is activated and used in the TeNB, and may indicate that the UE may receive a packet through corresponding CCs after the handover. The CC activation indicator may be used as an indicator to command activation of a corresponding CC.

Also, the handover request ACK message may further include CC allocation information (CC Allocation Info). The CC allocation information may be information associated with each CC set for the UE to simultaneously use a plurality of CCs in the TeNB, and may include CC allocation information associated with CCs allocated to the UE, information associated with an amount of allocated resources, information associated with a number of used CCs, bandwidth information of each CC, center frequency information, scheduling information, an antenna port number, and the like, but it may not be limited thereto.

The SeNB may determine whether a handover is allowable based on the handover request ACK message received from the TeNB so as to determine whether to perform the handover (HO Decision; step S620). The SeNB may transmit a handover command message to the UE (step S625). The handover command message may include a CC activation indicator. The CC activation indicator may be information associated with a plurality of CCs to be activated and used in the TeNB, and may be used as an indicator to activate a corresponding CC. Also, the handover command message may include CC allocation information. The CC allocation information may include CC allocation information associated with CCs allocated to the UE, information associated with an amount of allocated resources, information associated with a number of used CCs, bandwidth information of each CC, center frequency information, scheduling information, an antenna port number, and the like.

Subsequently, the UE may recognize information associated with CCs to be used in the TeNB through use of the CC allocation information and a CC activation indicator included in the handover command message, and may configure a predetermined CC and maintain the predetermined CC to be in an activation state. That is, the UE may terminate a connection with a currently connected cell (the SeNB) without a separate RRC reconfiguration signaling, and may start a process for connecting with a new cell (the TeNB) (step S630). The SeNB may transmit information associated with a status of the UE to the TeNB (step S635). In this example, the information associated with the status of the UE may be context information that is used by the UE in the SeNB. The UE may perform a handover complete process for the connection with the TeNB (HO Complete; step S640). The UE may complete the connection with the TeNB, and may transmit and receive packet data (step S645).

As described in the foregoing, the UE may determine whether the predetermined CC in the TeNB is activated through the CC activation indicator, and may determine that transmission and reception of a packet is available. That is, the UE that receives the CC activation indicator may activate the corresponding CC and may perform packet transmission and reception.

Therefore, activation information associated with a few or all of SCCs or SCells may be transmitted and received during a handover process without a separate activation signaling for a corresponding CC and thus, an activation state may be obtained in which data may be immediately received through all required CCs.

Figure 7:
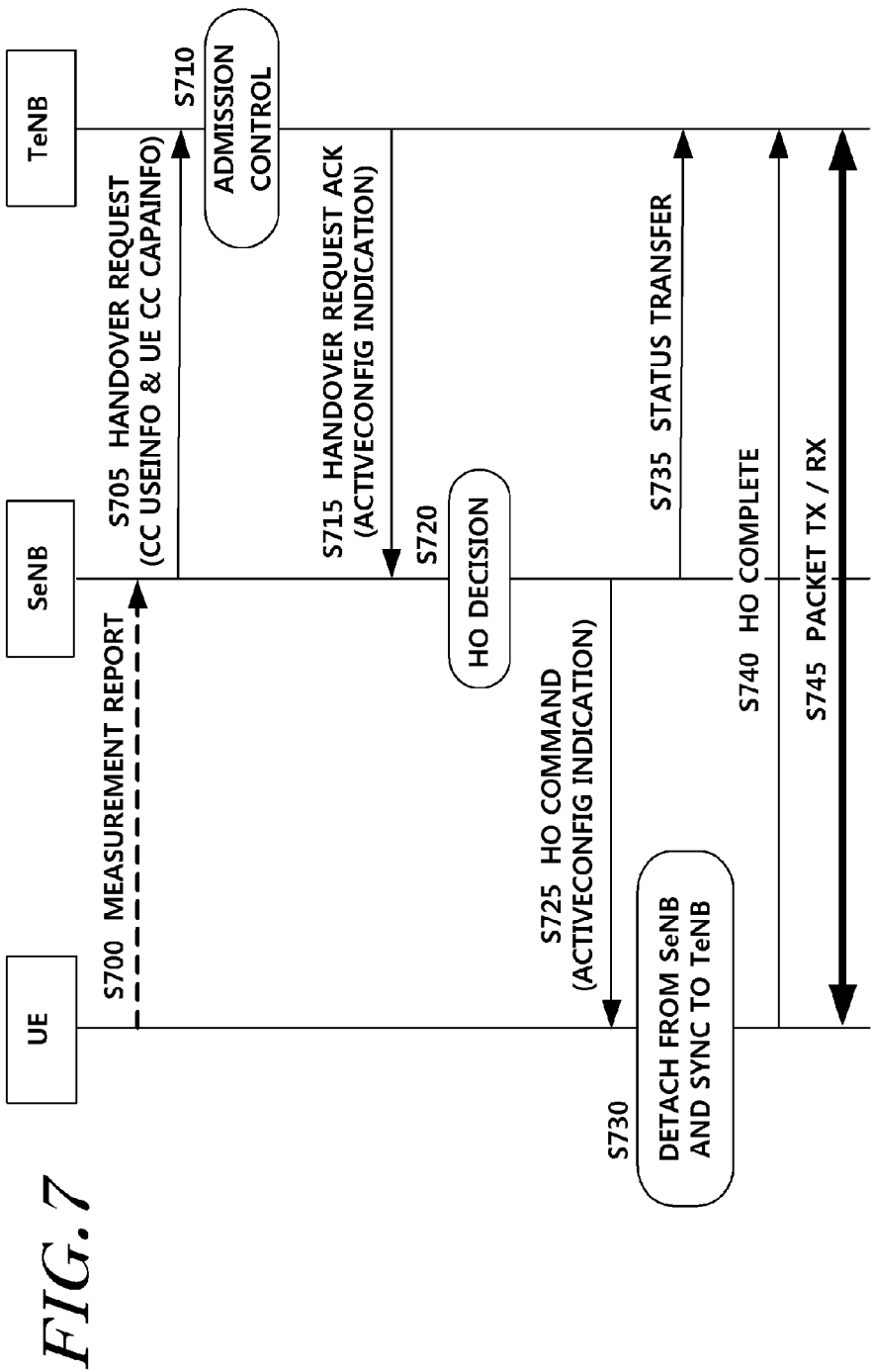
FIG. 7 is a diagram illustrating a handover signaling process according to another embodiment of the present invention.

FIG. 7 illustrates a handover signaling process according to another embodiment of the present invention.

Referring to FIG. 7, the UE may perform measurement based on a measurement process or scheme indicated by the SeNB, and may transmit a measurement result to the SeNB (step S700). The measurement report may be transmitted in response to a predetermined event.

The SeNB may determine whether a handover is required based on the measurement report received from the UE, and may transmit a handover request message to the TeNB (step S705). The handover request message may include CC capacity information and CC use information according to the embodiments of the present invention.

The TeNB may perform handover admission control that may allow or disallow a handover of a corresponding UE, based on a state of currently available resources and the like (step S710). The TeNB may configure all CCs available to the UE based on the CC capacity information so as to be a configuration complete state. In this example, the CCs in the configuration complete state may be changed to be in an activation state by the UE for packet transmission.

The TeNB may transmit a handover request ACK message to the SeNB (step S715). The handover request ACK message may include information associated with allowance or disallowance of the handover of the corresponding UE. The handover request ACK message may include an active configuration indicator (Active Config Indication) message. An active configuration indicator may be information associated with a CC that is allocated from the TeNB after the handover and is to be activated.

For example, a format of the active configuration indicator may be as follows.

First, the active configuration indicator may be configured in a bitmap form. For example, the active configuration indicator may be configured in a bitmap form having a length of up to 5 bits, as shown in Table 1. Each bit may indicate whether a CC is activated and is in a configuration complete state.

TABLE 1

|  | CC No. | | | | |
| --- | --- | --- | --- | --- | --- |
|  | CC1 | CC2 | CC3 | CC4 | CC5 |
| Bitmap | 0 | 0 | 1 | 1 | 0 |

In Table 1, CC3 and CC4 may be in a configuration complete state and an activation state (00110). For example, when CC1, CC3, and CC4 are in a configuration complete state and may be activated, the active configuration indicator may be formed to be a bitmap such as 10110.

Second, the active configuration indicator may be configured to be a bitmap having a length of up to 4 bits. A PCC is always in an activation state and thus, only information associated with configuration completion and activation information of remaining CCs, that is, SCCs, may need to be transferred. Information associated with the PCC may be transferred through a separate signaling by the TeNB to the SeNB. Accordingly, the active configuration indicator may be configured as shown in Table 2.

TABLE 2

|  | CC No. | | | |
| --- | --- | --- | --- | --- |
|  | CC1 | CC2 | CC4 | CC5 |
| Bitmap | 0 | 0 | 1 | 0 |

In Table 2, CC3 and CC4 are in a configuration complete state and an activation state (0010). In this example, CC3 is set to be a PCC and thus, an active configuration indicator may be set with respect to CC4. For example, when CC1, CC3, and CC4 are in the configuration complete state and the activation state, the active configuration indicator may be 1010.

Third, a mapping table may be configured.

In Table 3, remaining CCs excluding the PCC may be allocated as bitmap data and a mapping table may be applied to the bitmap data.

TABLE 3

| | Bitmap of active configuration indicator | CC1 | CC2 | CC4 | CC5 |
| --- | --- | --- | --- | --- | --- |
| 0 | 0 | 0 | 0 | 0 | 0 |
| 1 | 1 | 1 | 0 | 0 | 0 |
| 2 | 10 | 0 | 1 | 0 | 0 |
| 3 | 11 | 0 | 0 | 1 | 0 |
| 4 | 100 | 0 | 0 | 0 | 1 |
| 5 | 101 | 1 | 1 | 0 | 0 |
| 6 | 110 | 1 | 0 | 1 | 0 |
| 7 | 111 | 1 | 0 | 0 | 1 |
| 8 | 1000 | 0 | 1 | 1 | 0 |
| 9 | 1001 | 0 | 1 | 0 | 1 |
| 10 | 1010 | 0 | 0 | 1 | 1 |
| 11 | 1011 | 1 | 1 | 1 | 0 |
| 12 | 1100 | 1 | 1 | 0 | 1 |
| 13 | 1101 | 1 | 0 | 1 | 1 |
| 14 | 1110 | 0 | 1 | 1 | 1 |
| 15 | 1111 | 1 | 1 | 1 | 1 |

In Table 3, the active configuration indicator may indicate configuration completion and activation of a CC indicated by a corresponding index. That is, bit information corresponding to each index (or each case) may indicate an active configuration indicator associated with a corresponding CC. Configuration completion and activation of a plurality of CCs may be indicated through use of a small number of bits according to Table 3 and thus, a limited number of bits may be effectively used. Table 3 may be an example provided by assuming that CC3 is the PCC. A mapping table associated with all configured CCs including the PCC and the like may be configured, unlike Table 3.

In other words, varied schemes may be used to transmit an active configuration bitmap in Table 3.

A first scheme may use a portion or all of a location determined for the active configuration bitmap in a message. In this example, information of the active configuration indicator may be set to be 1, 2, 3, or 4 bits.

When the information bit is set to be 1 bit, such as the case 0, case 1, and the like, only 1 bit is used and remaining 3 bits may not be used (the 1 bit is valid and the remaining bits are null). When the information bit is set to be 2 bits, such as the case 1, case 2, and the like, only 2 bits are used and remaining 2 bits may not be used (the 2 bits are valid and the remaining bits are null). When the information bit is set to be 3 bits, such as the cases 4, 5, 6, 7, and the like, only 3 bits are used and a remaining 1 bit may not be used (3 bits are valid and the remaining bit is null). When the information bit is set to 4 bits, such as the cases 8 through 15, all the 4 bits are used. A transmission structure for the active configuration bitmap may be provided in a predetermined size.

A second scheme may configure a total size of a transmitted bit to be variable.

When the information bit is set to be 1 bit, such as the case 0, case 1, and the like, only 1 bit is used as the active configuration bitmap and thus, only 1 bit is added in the entire message format. When the information bit is set to be 2 bits, such as the case 2, case 3, and the like, only 2 bits are used as the active configuration bitmap and thus, only 2 bits are added in the entire message format. When the information bit is set to be 3 bits, such as the case 4, 5, 6, 7, and the like, only 3 bits are used as the active configuration bitmap and thus, only 3 bits are added in the entire message format. When the information bit is set to be 4 bits, such as the cases 8 through 15, only 4 bits are used as the active configuration bitmap and thus, 4 bits are added in the entire message format. A transmission structure for the active configuration bitmap may be provided in a variable size.

A third scheme may determine active configuration bitmap information by assuming that it corresponds to one of the cases 8 through 15 when an additional indicator does not exist, and may additionally transmit active configuration bitmap information for the remaining cases 0 through 7. For the cases 0 through 7, an indicator may need to be set and additionally transmitted. For example, the cases 0 through 7 may be indicated by configuring an indicator of 3 bits and by performing sequential mapping. The cases 0 through 7 may be distinguished by a size of active configuration bitmap information for each case, and the like. When the additional indicator does not exist, an active configuration bitmap of 4 bits may be recognized to be 4 bits and the 4 bits may be interpreted to distinguish a corresponding case.

In the specifications, although the transmission structure for the active configuration bitmap (a field for the active configuration indicator) is assumed to have a size of 4 bits, the size of the field may be variable based on an operation of a system. In this example, an SeNB and a TeNB may define and use the same variable size. The format of the active configuration indicator is merely an example, and may have a different format when the format is capable of expressing configuration completion and activation information associated with a CC.

The SeNB may determine whether a handover is allowable based on the handover request ACK Message received from the TeNB, and may determine whether to perform the handover (HO Decision; step S720). The SeNB may transmit a handover command message to the UE (step S725). The handover command message may include information associated with a CC configured by the UE by receiving from the TeNB and an active configuration indicator indicating an activation state. In this example, the active configuration indicator that the SeNB transmits to the UE may be the same as an active configuration indicator previously received from the TeNB or may be information newly defined in a form that the UE may be able to use, based on the received active configuration indicator information.

The UE may determine an active configuration indicator included in the handover command message, may determine information associated with an activated CC to be used in the TeNB, may maintain a predetermined CC to be in an active state, and may perform a handover without an additional signaling. That is, the UE may terminate a connection with a currently connected cell, and may start a process for connecting with a new cell (step S730). Accordingly, the SeNB may transmit information associated with a status of the UE to the TeNB (step S735). The SeNB may transmit UE context information used by the SeNB.

The UE may transmit a handover complete message (HO complete; step S740), and may perform transmission and reception of packet data (step S745).

As described in the foregoing, the UE may be aware that a packet may be transmitted through a predetermined CC of the TeNB, based on the active configuration indicator.

In other words, FIG. 7 includes a process of receiving CC configuration information associated with CCs to be used by the UE in the TeNB and information associated with whether each CC is activated, and a process of receiving CC allocation information (CC Allocation Info) and information associated with a CC activation indicator (CC Activation Ind) through a single message format. That is, the UE may complete configuration of CCs available to the UE, based on CC capacity information (UE CC CapaInfo).

The SeNB may transmit, to the TeNB, a handover request message including CC capacity information and CC use information, and may transmit, to the SeNB, a handover request ACK message including an active configuration indicator message. The SeNB may transmit a handover command message including the active configuration indicator message to the UE. The active configuration indicator message may include information associated with a CC that is in a configuration complete state by the UE after the handover from among CCs, so as to be activated.

The active configuration indicator may include information associated with a CC that is in configuration complete state and in an activation state, and CC information of each CC. The configuration completion state and the activation state may indicate a state in which setting with respect to a physical layer, a radio protocol layer is completed so that the SeNB or the TeNB may immediately use corresponding CCs in the TeNB, that is, a state in which CC configuration and activation may be completed.

Figure 8:
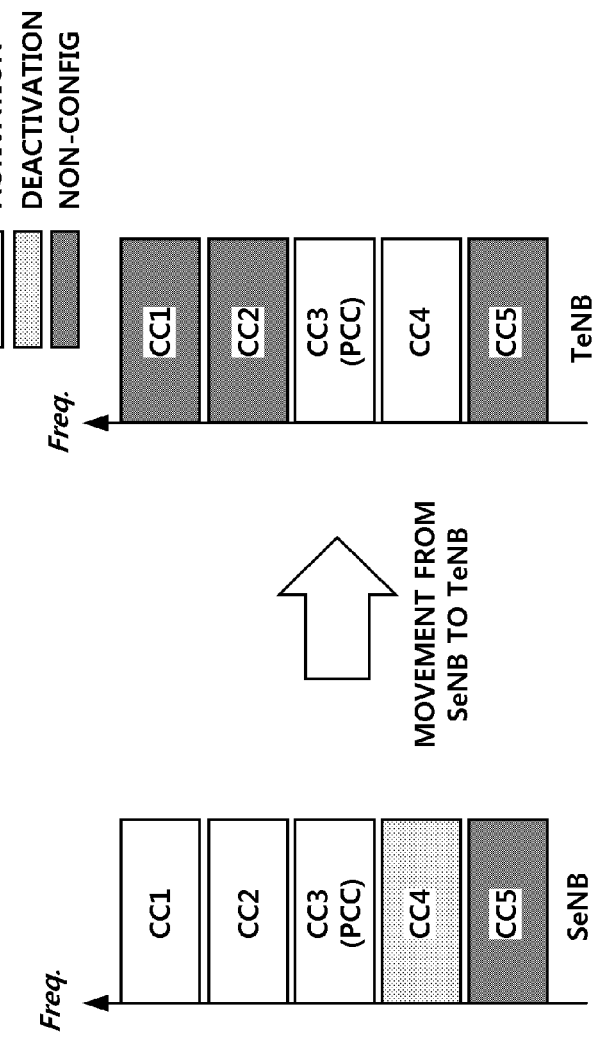
FIG. 8 is a diagram illustrating a CC configuration according to another embodiment of the present invention.

FIG. 8 illustrates a CC configuration according to an embodiment of the present invention.

Referring to FIG. 8, a UE may configure at least one of a plurality of CCs to be in a configuration complete state, and simultaneously, may set the at least one CC to be in an activation state, through use of CC allocation information (CC Allocation Info) and a CC activation indicator (the embodiment of FIG. 6) included in a handover command message transmitted from an SeNB before a handover, or an active configuration indicator (the is embodiment of FIG. 7) included in the handover command message. Accordingly, data may be transmitted and received without a separate signaling after the handover.

That is, after configuration completion and activation of CC3 corresponding to a PCC, CC4 and CC5 corresponding to SCCs may be configured, CC3 and CC4 may be activated by the CC activation indicator (the embodiment of FIG. 6) or the active configuration indicator (the embodiment of FIG. 7) and thus, data may be immediately received through CC3 and CC4.

Figure 9:
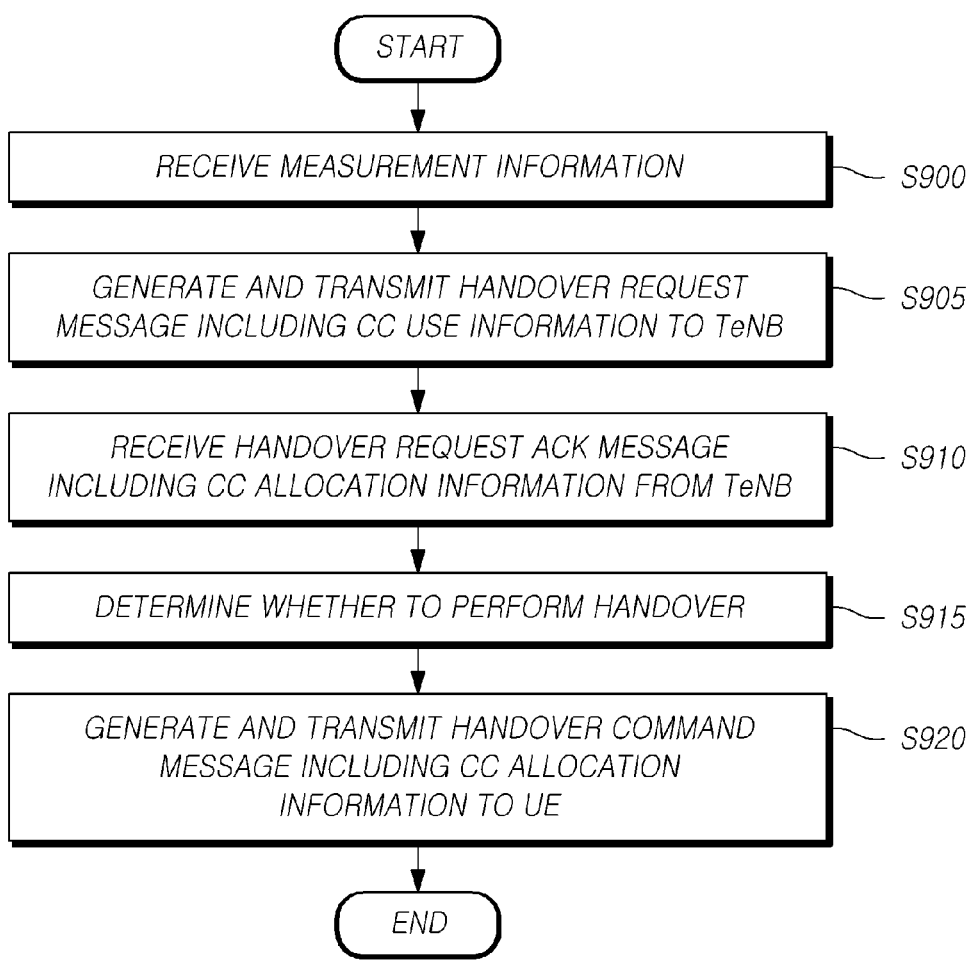
FIG. 9 is a flowchart illustrating a handover signaling process in a source evolved NodeB (SeNB) according to an embodiment of the present invention.

FIG. 9 illustrates a handover signaling in an SeNB according to an embodiment of the present invention.

Referring to FIG. 9, the SeNB may receive measurement information from a UE (step S900), and may generate a handover request message including CC use information and may transmit the handover request message to a TeNB (step S905).

The SeNB may receive a handover request ACK message including CC allocation information (CC Allocation Info) from the TeNB (step S910), and may determine whether a handover is allowable based on the received handover request ACK message (step S915).

The SeNB may generate a handover command message including the received CC allocation information, and may transmit the handover command message to the UE (step S920).

Figure 10:
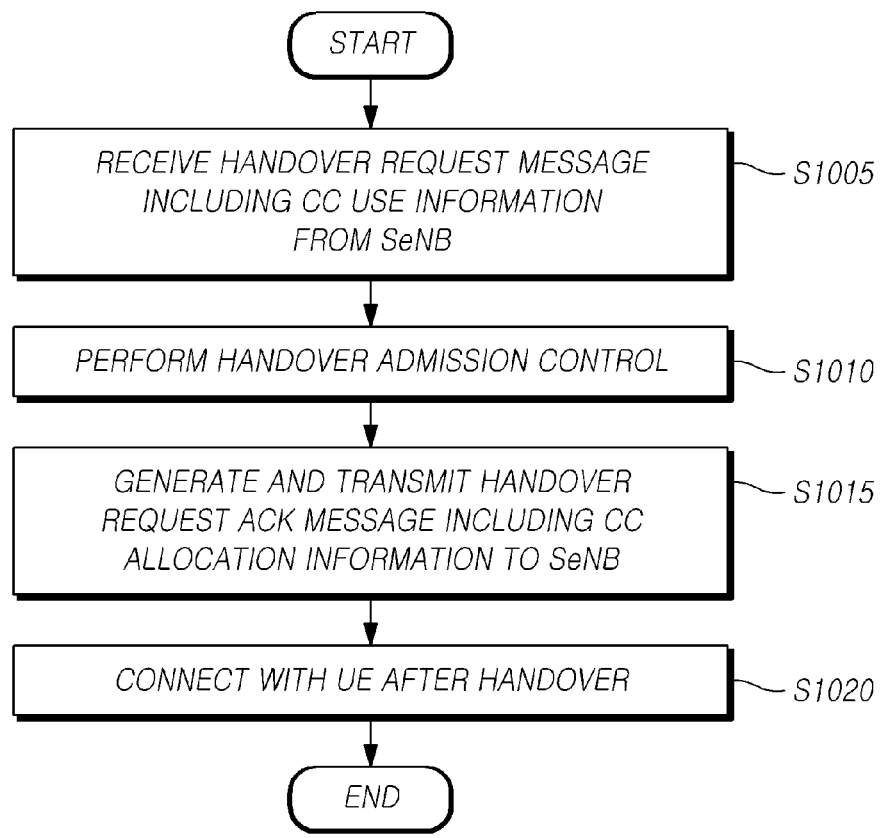
FIG. 10 is a flowchart illustrating a handover signaling process in a target eNB (TeNB) according to an embodiment of the present invention.

FIG. 10 illustrates a handover signaling in a TeNB according to an embodiment of the present invention.

Referring to FIG. 10, the TeNB may receive, from an SeNB, a handover request message including CC use information (CC Use Info) (step S1005), and may perform handover admission control that may allow or disallow a handover of a corresponding UE based on a state of currently available resources (step S1010).

The TeNB may generate a handover request ACK message including CC allocation information (CC Allocation Info) and may transmit the handover request ACK message to an SeNB (step S1015), and may connect with the corresponding UE after the handover and may perform transmission and reception of packet data (step S1020). That is, the UE may configure CCs to be used in the TeNB through use of the CC allocation information, and may continuously perform transmission and reception of data without a separate RRC reconfiguration signaling.

Figure 11:
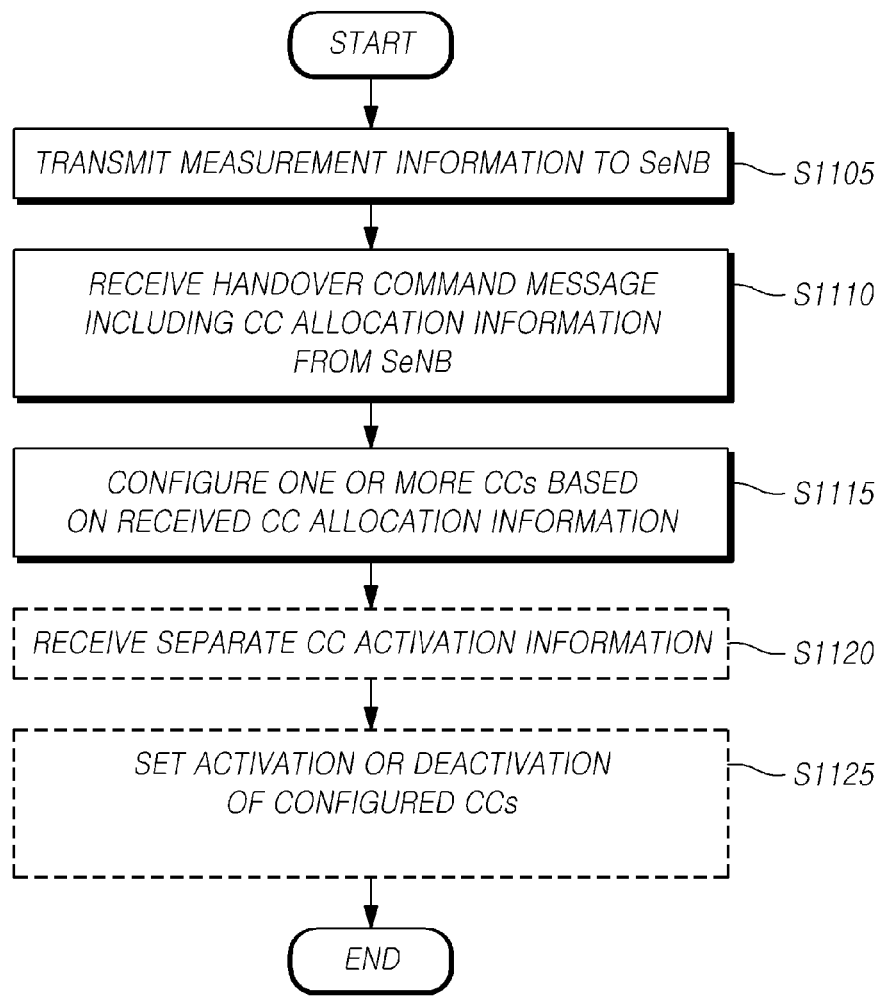
FIG. 11 is a flowchart illustrating a handover signaling method in a user equipment (UE) according to an embodiment of the present invention.

FIG. 11 illustrates a handover signaling method in a UE according to an embodiment of the present invention.

Referring to FIG. 11, the UE may transmit measurement information to an SeNB (step S1105), and may receive a handover command message including CC allocation information (CC Allocation Info) from the SeNB (step S1110). The UE may configure CCs to be used in a TeNB based on the CC allocation information included in the handover command message (step S1115).

The UE may receive separate CC activation information from an upper layer or the TeNB for activation of each of at least one CC configured based on the CC allocation information (step S1120), and may set activation or deactivation of a corresponding CC based on the CC activation information (step S1125).

In FIGS. 9 through 11, the CC use information may be information associated with CCs that may be simultaneously used by the UE in the SeNB, and may include CC allocation information associated with CCs allocated to the UE, information associated with an amount of resources, information associated with a number of used CCs, bandwidth information of each CC, center frequency information, scheduling information, and the like, but it may not be used thereto. Also, the CC allocation information may be information associated with CCs to be used in the TeNB after the handover, and may include CC allocation information associated with CCs allocated to the UE, information associated with an amount of allocated resources, information associated with a number of used CCs, bandwidth information of each CC, center frequency information, scheduling information, an antenna port number, and the like.

Figure 12:
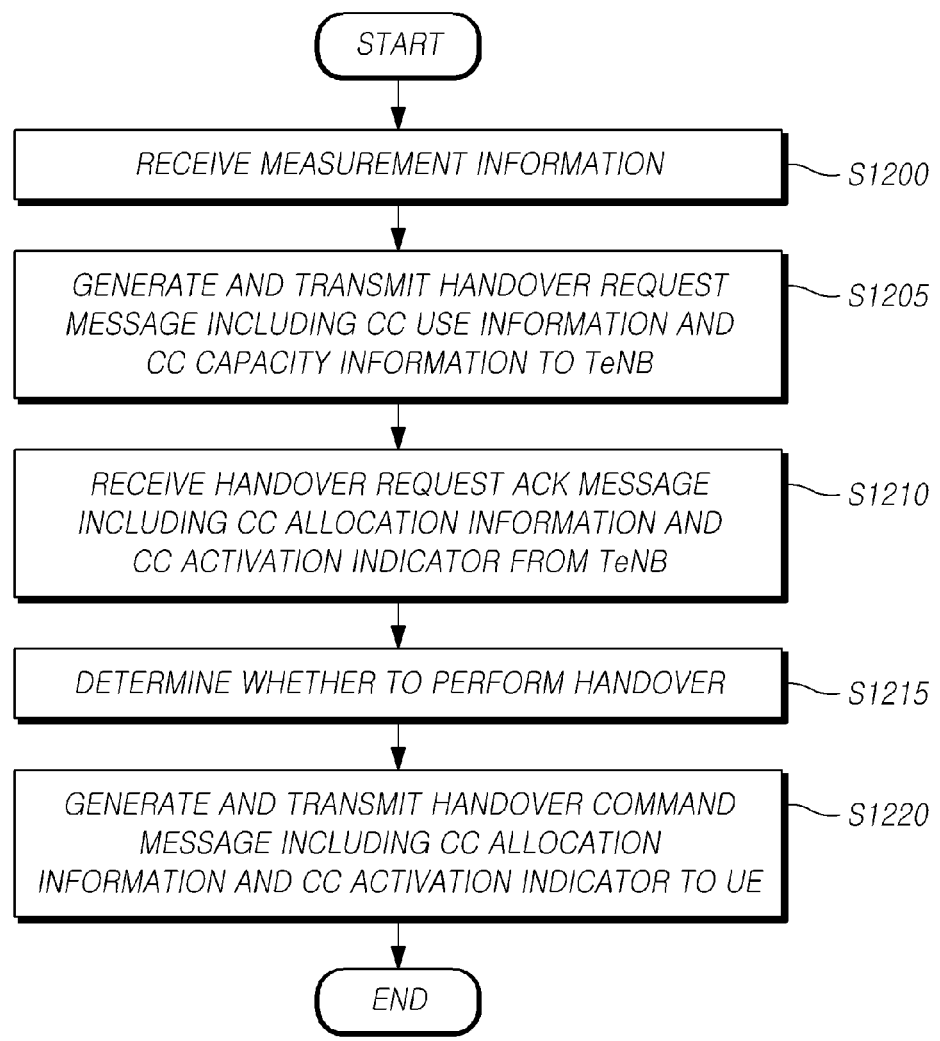
FIGS. 12 through 14 are flowcharts illustrating handover signalings in an SeNB, a TeNB, and a UE, according to another embodiment of the present invention.

FIG. 12 illustrates a handover signaling method in an SeNB, according to another embodiment of the present invention.

Referring to FIG. 12, the SeNB may receive measurement information from a UE (step S1200), and may generate a handover request message including CC use information (CC Use Infor), CC capacity information (UE CC CapaInfo), and the like, and may transmit the handover request message to a TeNB (step S1205).

The SeNB may receive a handover request ACK message including CC allocation information (CC Allocation Info) and a CC activation indicator (CC Activation Ind) from the TeNB (step S1210), and may determine whether a handover is allowable based on the received handover request ACK message (step S1215).

The SeNB may generate a handover command message including the received CC allocation information and the CC activation indicator, and may transmit the handover command message to the UE (step S1220).

Accordingly, based on the CC allocation information and the CC activation indicator included in the handover command message, the UE may configure CCs to be used in the TeNB, and simultaneously, may set activation or deactivation of each CC, so as to enable data transmission and reception.

Figure 13:
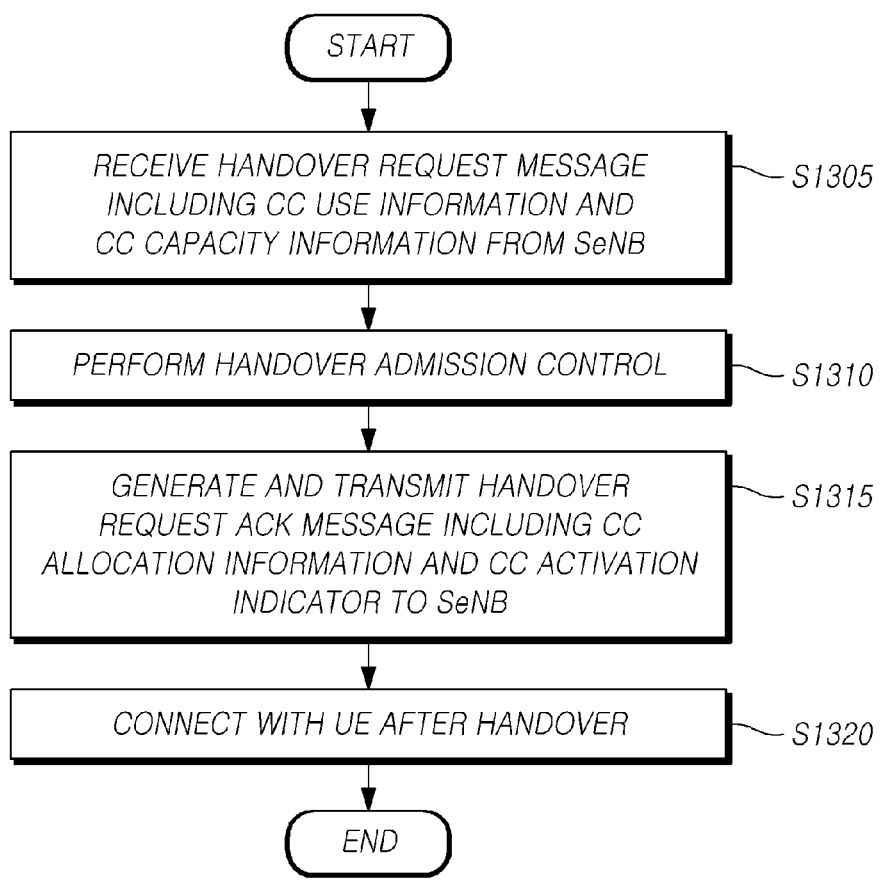

FIG. 13 illustrates a handover signaling method in a TeNB according to another embodiment of the present invention.

Referring to FIG. 13, the TeNB may receive a handover request message including CC use information (CC Use Info), CC capacity information (UE CC CapaInfo), and the like, from an SeNB (step S1305), and may perform handover admission control that may allow or disallow a handover of a corresponding UE (step S1310).

The TeNB may generate a handover request ACK message including the CC allocation information and the CC activation indicator, and may transmit the handover request ACK message to the SeNB (step S1315), and may connect with a corresponding UE after a handover (step S1320). Based on a handover command message included in the CC allocation information and the CC activation indicator (CC Activation Ind), the UE may configure one or more CCs to be used in the TeNB, and simultaneously, may set activation or deactivation of each CC.

Figure 14:
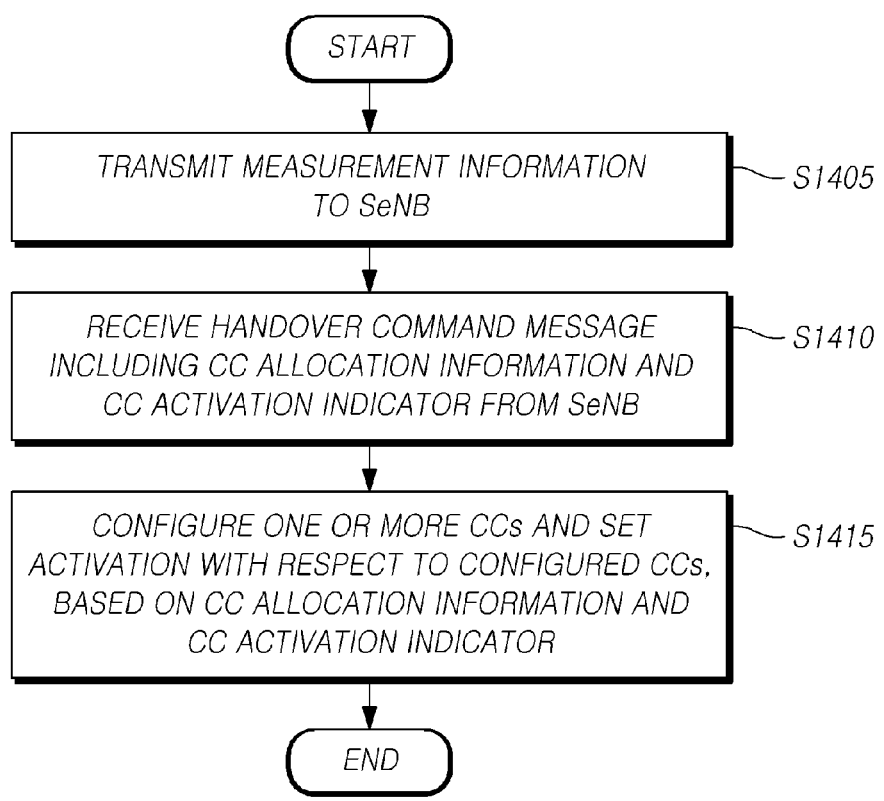

FIG. 14 illustrates a handover signaling method in a UE according to another embodiment of the present invention.

Referring to FIG. 14, the UE may transmit measurement information to an SeNB (step S1405), and may receive a handover command message including CC allocation information and a CC activation indicator from the SeNB (step S1410).

The UE may configure one or more CCs to be used in a TeNB and may set activation with respect to the configured CCs, based on the CC allocation information and the CC activation indicator included in the received handover command message (step S1415).

Figure 15:
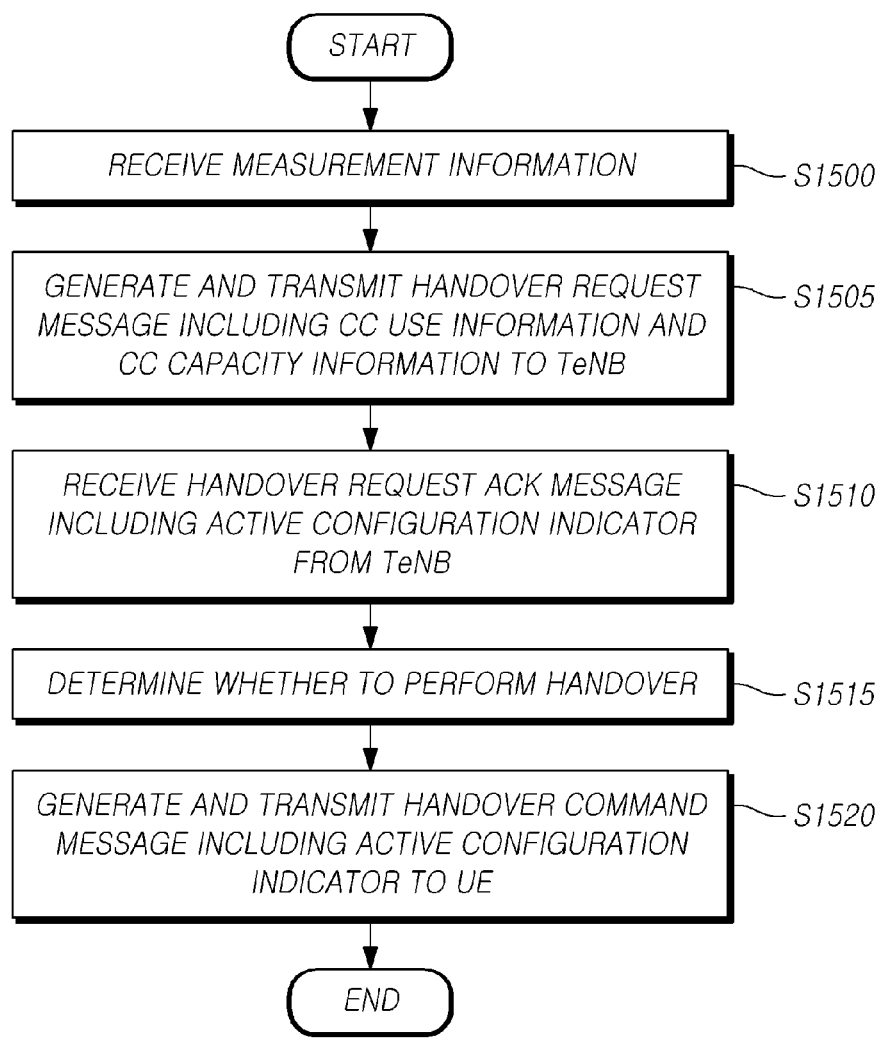
FIGS. 15 through 17 are flowcharts illustrating handover signaling methods performed in an SeNB, a TeNB, and a UE according to another embodiment of the present invention.

FIG. 15 illustrates a handover signaling method performed in an SeNB according to another embodiment.

Referring to FIG. 15, the SeNB may receive measurement information from a UE (step S1500), and may generate a handover request message including CC use information and CC capacity information and may transmit the handover request message to a TeNB (step S1505).

The SeNB may receive a handover request ACK message including an active configuration indicator (Active Config Indication) from the TeNB (step S1510), and may determine whether a handover is allowable based on the received handover request ACK message (step S1515).

The SeNB may generate a handover command message including the received active configuration indicator, and may transmit the handover command message to the UE (step S1520). Based on the active configuration indicator included in the handover command message, the UE may configure CCs and set activation with respect to each CC.

Figure 16:
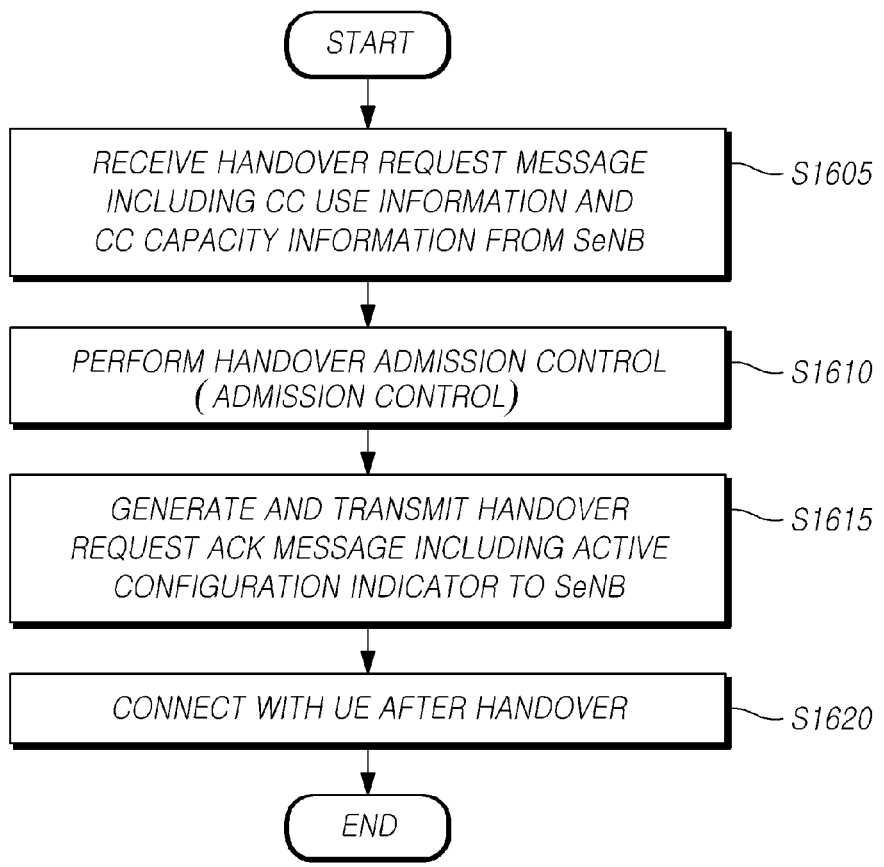

FIG. 16 illustrates a handover signaling method performed in a TeNB according to an embodiment of the present invention.

Referring to FIG. 16, the TeNB may receive a handover request message including CC use information and CC capacity information from an SeNB (step S1605), and may perform handover admission control that may allow or disallow a handover of a corresponding UE (step S1610).

The TeNB may generate a handover request ACK message including the active configuration indicator, may transmit the handover request ACK message to the SeNB (step S1615), and may connect with the corresponding UE after a handover (step S1620).

The active configuration indicator that is transmitted by TeNB to the SeNB may be transferred again to the UE, and the UE may configure one or more CCs to be used in the TeNB, and simultaneously, may set activation or deactivation of each CC, based on the active configuration indicator (Active Config Indication) included in a handover command message received from the SeNB. Accordingly, after the handover, transmission and reception of data may be continuously performed without a separate signaling.

Figure 17:
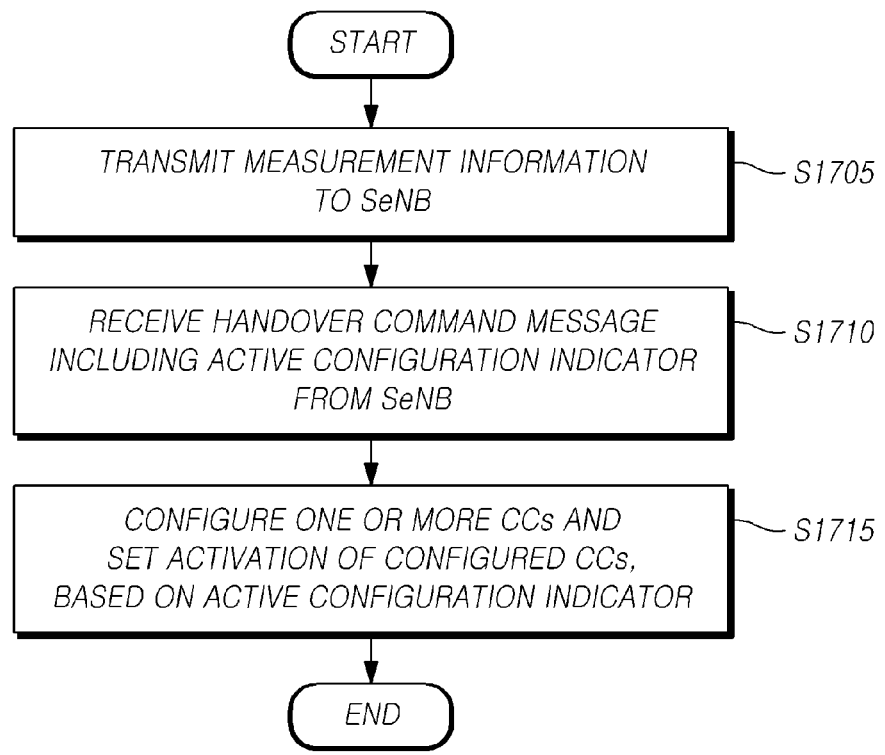

FIG. 17 illustrates a handover signaling method performed in a UE according to an embodiment of the present invention.

Referring to FIG. 17, the UE may transmit measurement information to an SeNB (step S1705), and may receive a handover command message including an active configuration indicator (Active Config Indication) from the SeNB (step S1710).

The UE may configure CCs to be used in the TeNB and may set activation with respect to each CC, based on the active configuration indicator included in the received handover command message (step S1715).

Figure 18:
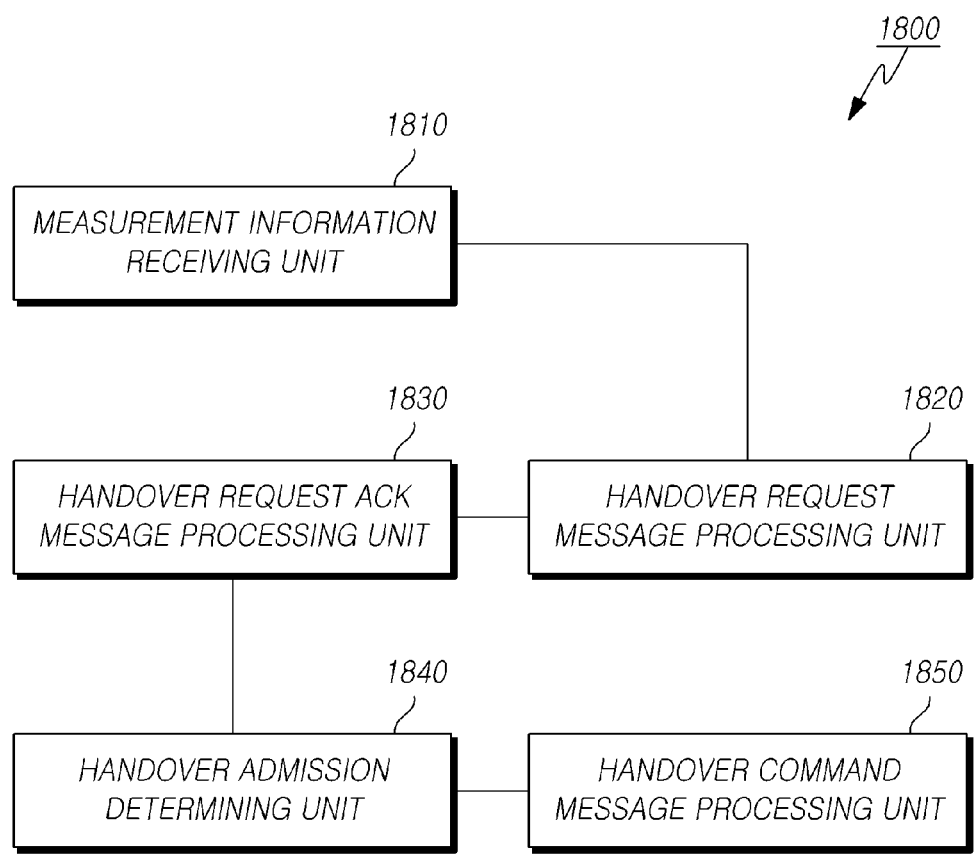
FIG. 18 is a diagram illustrating a configuration of a handover signaling apparatus according to an embodiment of the present invention.

FIG. 18 illustrates a configuration of a handover signaling apparatus, embodied in an SeNB, according to an embodiment of the present invention.

Referring to FIG. 18, a handover signaling apparatus 1800 may be configured to include a measurement information receiving unit 1810, a handover request message processing unit 1820, a handover request ACK message processing unit 1830, a handover admission determining unit 1840, and a handover command message processing unit 1850. Depending on a case, the measurement information receiving unit 1810, the handover admission determining unit 1840, and the like may be omitted.

First, the measurement information receiving unit 1810 may receive a measurement report transmitted from a UE in a predetermined event and the like, and may determine a measurement result.

The handover request message processing unit 1820 may determine whether a handover is required, based on the measurement report of the UE received from the measurement information receiving unit 1810, may generate a handover request message, and may transmit the handover request message to a TeNB.

The handover request message may include CC use information (CC Use Info). The CC use information may be information associated with each of configured CCs of an SeNB, to be used by the UE, and may include CC allocation information associated with CCs allocated to the UE, information associated with an amount of allocated resources, information associated with a number of used CCs, bandwidth information of each CC, center frequency information, scheduling information, and the like. As another example, the handover request message may additionally include CC capacity information (UE CC CapaInfo) in addition to the CC use information.

The handover request ACK message processing unit 1830 may receive a handover request ACK message transmitted from the TeNB. The handover request ACK message may include CC allocation information (CC Allocation Info), may include both the CC allocation information and a CC activation indicator (CC Activation Ind), or may further include an active configuration indicator. The CC allocation information, the CC activation indicator, and the active configuration indicator may include information associated with CCs to be allocated by the TeNB to the UE for use, after a handover.

The handover admission determining unit 1840 may determine whether a handover is allowable based on the handover request ACK message received from the TeNB, and may determine whether to perform the handover.

The handover command message processing unit 1850 may generate a handover command message, and may transmit the handover command message to the UE. The handover command message may include CC allocation information, may include both the CC allocation information and a CC activation indicator, or may further include an active configuration indicator. In this example, the CC allocation information, the CC activation indicator, the active configuration indicator may be the same information as information included in the handover request ACK message that the SeNB receives from the TeNB, or may be information that is changed from the received information based on a communication environment of the UE.

The handover command message processing unit 1850 may select at least one of the CC allocation information, the CC activation indicator, and the active configuration indicator, and include the selected one in the handover command message. Therefore, before a handover, the UE may complete configuration with the TeNB so as to determine information associated with at least one CC to be used, and may perform required operations (pre-operations for connection, such as activation and the like) so as to support continuous communication with the TeNB after the handover.

Figure 19:
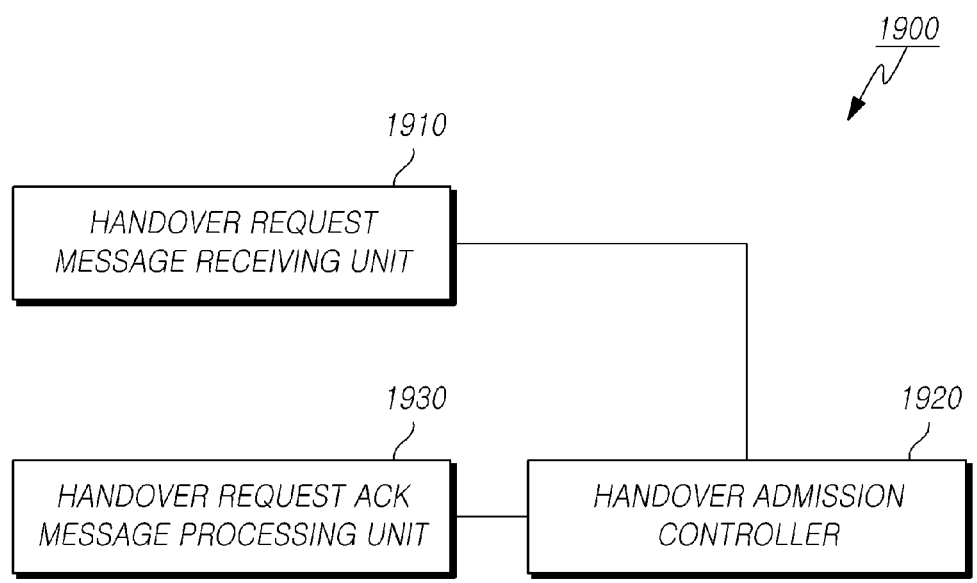
FIG. 19 is a diagram illustrating a configuration of a handover signaling apparatus according to an embodiment of the present invention.

FIG. 19 illustrates a configuration of a handover signaling apparatus, embodied in a TeNB, according to an embodiment of the present invention.

Referring to FIG. 19, a handover signaling apparatus 1900 may include a handover request message receiving unit 1910, a handover admission controller 1920, a handover request ACK message processing unit 1930, and the like. Depending on a case, the handover admission controller may not be included.

The handover request message receiving unit 1910 may receive a handover request message transmitted from an SeNB, and may determine CC use information (CC Use Info) or CC capacity information (UE CC CapaInfo) in the handover request message.

The handover admission controller 1920 may perform handover admission control that may allow or disallow a handover of a corresponding UE, based on a state of currently available resources, in response to the received handover request message.

The handover request ACK message processing unit 1930 may generate a handover request ACK message, and may transmit the handover request ACK message to the SeNB.

The handover request ACK message may include CC allocation information (CC Allocation Info), may include both the CC allocation information and a CC activation indicator, or may further include an active configuration indicator.

Figure 20:
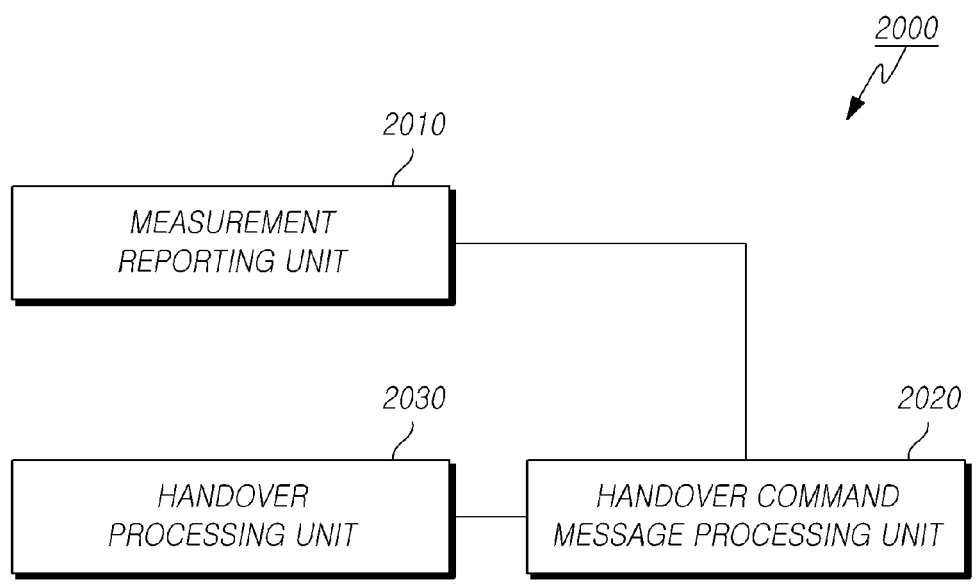
FIG. 20 is a diagram illustrating a configuration of a handover signaling apparatus according to an embodiment of the present invention.

FIG. 20 illustrates a configuration of a handover signaling apparatus, embodied in a UE, according to an embodiment of the present invention.

Referring to FIG. 20, a handover signaling apparatus 2000 may include a measurement reporting unit 2010, a handover command message processing unit 2020, a handover processing unit 2030, and the like.

The measurement reporting unit 2010 may perform measurement autonomously or by direction of an SeNB, or may perform measurement based on a scheme indicated by the SeNB, in a predetermined event and the like, and may transmit a measurement result to the SeNB.

The handover command message processing unit 2020 may receive a handover command message from the SeNB. The handover command message may include only CC allocation information, or may include both the CC allocation information and a CC activation indicator, or may further include an active configuration indicator. The CC allocation information, the CC activation indicator, and the active configuration indicator may be information associated with CCs to be used by the UE in the TeNB after a handover. The handover processing unit 2030 may selectively use at least one of the CC allocation information, the CC active indicator, and the active configuration indicator included in the handover command message, may complete CC configuration with the TeNB and/or may set activation of each CC, and may perform operations required for connecting with the TeNB through a corresponding CC.

The handover processing unit 2030 may perform RACH for layer 1 and 2 connection, for a handover to the TeNB through a corresponding CC.

As described in the foregoing, the UE may selectively use at least one of the CC allocation information, the CC activation indicator, and the active configuration indicator included in the handover command message transmitted from the SeNB, may complete RRC configuration with the TeNB and may determine information associated with one or more CCs to be used after a handover, and may perform required operations (pre-operations for connection, such as activation and the like) before the handover. Accordingly, after the handover, continuous communication with the TeNB may be performed through a multi-CC without a separate signaling.

Therefore, according to embodiments of the present invention, when the UE connects with a new eNB due to movement of the UE in a wireless communication system that provides a plurality of CCs, information associated with CCs to be used in the new eNB may be transmitted and received during a handover and thus, a service quality that has been provided in an SeNB may be secured without a separate CC reconfiguration process. Also, the UE may be informed of information associated with CCs to be used in a new TeNB, in advance, and thus, the UE may become capable of using a plurality of CCs in the new TeNB in the least amount of time.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of performing a handover in a communication system that uses a multi-component carrier (CC), the method comprising:

receiving, by a source evolved Node B (SeNB), a measurement result transmitted from a user equipment (UE);

generating, by the SeNB, a handover request message including at least one of information associated with at least one CC configured for the UE and information associated with a capability of the UE associated with the at least one CC, and transmitting the handover request message to a target eNB (TeNB);

generating, by the TeNB, a handover request acknowledgement (ACK) message including at least one of CC allocation information (CC Allocation Info) corresponding to information associated with CCs to be used by the UE, both the CC allocation information and a CC activation indicator (CC Activation Ind) associated with the CC allocation information, and an active configuration indicator having a predetermined bit length with respect to allocated CCs, in response to the handover request message, and transmitting the handover request ACK message to the SeNB;

transmitting, from the SeNB to the UE, a handover command message generated based on the handover request ACK message, the handover command message being configured for the UE to determine CC allocation information included in the handover command message and to complete the handover to the TeNB, wherein the CC allocation information included in the handover command message includes information associated with CCs to be used in the TeNB and further includes at least one of CC allocation information associated with CCs allocated to the UE, information associated with an amount of allocated resources, information associated with a number of used CCs, information associated with a bandwidth of each CC, center frequency information, scheduling information, and antenna port number information.

2. The method as claimed in claim 1, wherein the information associated with the at least one CC configured for the UE corresponds to information associated with the CCs configured by the SeNB for the UE, and the information is configured in a form of configuration list (ConfigList).

3. The method as claimed in claim 2, wherein the information associated with the at least one CC configured for the UE further comprises radio resource configuration information associated with the CCs configured by the SeNB for the UE.

4. The method as claimed in claim 3, wherein the information associated with the at least one CC configured for the UE corresponds to information associated with CC(s) that is set by the SeNB for the UE to simultaneously use a plurality of CCs, and corresponds to CC use information including at least one of CC allocation information associated with CCs allocated to the UE, information associated with an amount of allocated resources, information associated with a number of used CCs, information associated with a bandwidth of each CC, center frequency information, and scheduling information.

5. The method as claimed in claim 1, wherein the active configuration indicator comprises:

information indicating activation in which the CCs configured for the UE are capable of transceiving a packet, or deactivation in which the CCs are incapable of transmitting a packet, wherein the active configuration indicator has a variable length that varies based on a number of the CCs configured for the UE, and indicates activation or deactivation of a corresponding CC through use of a bit.

6. The method as claimed in claim 5, wherein the active configuration indicator comprises:

information indicating activation or deactivation with respect to each of secondary CCs (SCCs) excluding a primary CC (PCC) from among the CCs configured for the UE.

7. The method as claimed in claim 1, further comprising:

determining, by the UE, the CC activation indicator included in the handover command message; and completing the handover to the TeNB through use of the CC activation indicator without performing a Radio Resource Connection (RRC) procedure with respect to the TeNB and the CC to be used, and transceiving a packet.

8. A handover signaling apparatus in a communication system that uses a multi-component carrier (CC), the apparatus comprising:

a processor to generate a handover request message including at least one of information associated with at least one CC configured for a user equipment (UE) and information associated with a capability of the UE associated with the at least one CC; and a transceiver, to transmit the handover request message to a target evolved NodeB (TeNB) and to receive, from the TeNB, a handover request acknowledgement (ACK) message configured by the TeNB to include at least one of CC allocation information (CC Allocation Info) corresponding to information associated with CCs to be used by the UE, both the CC allocation information and a CC activation indicator (CC Activation Ind) associated with the CC allocation information, and an active configuration indicator having a predetermined bit length with respect to allocated CCs, wherein the transceiver transmits, to the UE, a handover command message generated based on the handover request ACK message, the handover command message being configured for the UE to determine CC allocation information included in the handover command message and to complete the handover to the TeNB, and wherein the CC allocation information included in the handover command message includes information associated with CCs to be used in the TeNB and further includes at least one of CC allocation information associated with CCs allocated to the UE, information associated with an amount of allocated resources, information associated with a number of used CCs, information associated with a bandwidth of each CC, center frequency information, scheduling information, and antenna port number information.

9. A handover signaling apparatus in a communication system that uses a multi-component carrier (CC), the apparatus comprising:

a transceiver to receive, from a source evolved NodeB (SeNB), a handover request message including at least one of information associated with at least one CC configured for a user equipment (UE) and information associated with a capability of the UE associated with the at least one CC; and a processor to generate, in response to the handover request message, a handover request acknowledgement (ACK) message including at least one of CC allocation information (CC Allocation Info) corresponding to information associated with CCs to be used by the UE, both the CC allocation information (CC Allocation Info) and a CC activation indicator (CC Activation Ind) associated with the CC allocation information, and an active configuration indicator having a predetermined bit length with respect to allocated CCs; and completing a handover of the UE moving from the SeNB to the apparatus, wherein the transceiver transmits the handover request ACK message to the SeNB, wherein the handover is completed after the SeNB transmits, to the UE, a handover command message generated based on the handover request ACK message, the handover command message being configured for the UE to determine CC allocation information included in the handover command message and to complete the handover to the apparatus, and wherein the CC allocation information included in the handover command message includes information associated with CCs to be used in the TeNB and further includes at least one of CC allocation information associated with CCs allocated to the UE, information associated with an amount of allocated resources, information associated with a number of used CCs, information associated with a bandwidth of each CC, center frequency information, scheduling information, and antenna port number information.

10. A user equipment (UE) in a communication system that uses a multi-component carrier (CC), the UE comprising:

a transceiver to receive a handover command message that is generated and transmitted by a source evolved NodeB (SeNB), the handover command message being configured based on a handover request acknowledgement (ACK) message configured by a target eNB (TeNB) to include at least one of CC allocation information (CC Allocation Info) corresponding to information associated with CCs to be used by the UE, both the CC allocation information (CC Allocation Info) and a CC activation indicator (CC Activation Ind) associated with the CC allocation information, and an active configuration indicator having a predetermined bit length with respect to allocated CCs; and a processor to determine CC allocation information included in the handover command message, and to complete a handover to the TeNB based on the handover command message, wherein the CC allocation information included in the handover command message includes information associated with CCs to be used in the TeNB and further includes at least one of CC allocation information associated with CCs allocated to the UE, information associated with an amount of allocated resources, information associated with a number of used CCs, information associated with a bandwidth of each CC, center frequency information, scheduling information, and antenna port number information.

* * * * *